United States Patent
Moriya et al.

(10) Patent No.: US 11,198,634 B2
(45) Date of Patent: Dec. 14, 2021

(54) CURVED COVER GLASS AND METHOD FOR MANUFACTURING SAME, AND GLASS MEMBER, DISPLAY DEVICE, AND CURVED GLASS

(71) Applicant: AGC Inc., Chiyoda-ku (JP)

(72) Inventors: Koki Moriya, Tokyo (JP); Takeaki Ono, Tokyo (JP)

(73) Assignee: AGC Inc., Chiyoda-ku (JP)

( * ) Notice: Subject to any disclaimer, the term of this patent is extended or adjusted under 35 U.S.C. 154(b) by 285 days.

(21) Appl. No.: 15/686,496

(22) Filed: Aug. 25, 2017

(65) Prior Publication Data

US 2017/0349473 A1 Dec. 7, 2017

Related U.S. Application Data

(63) Continuation of application No. PCT/JP2016/055299, filed on Feb. 23, 2016.

(30) Foreign Application Priority Data

Feb. 25, 2015 (JP) .............................. JP2015-035183

(51) Int. Cl.
*B32B 3/24* (2006.01)
*C03B 23/035* (2006.01)
(Continued)

(52) U.S. Cl.
CPC ............ *C03B 23/0357* (2013.01); *B28D 1/14* (2013.01); *C03B 23/0252* (2013.01);
(Continued)

(58) Field of Classification Search
CPC ...................................................... B32B 3/266
(Continued)

(56) References Cited

U.S. PATENT DOCUMENTS 4,319,907 A * 3/1982 Pike ...................... C03B 27/052
65/104
6,749,926 B1 6/2004 Yoshizawa
(Continued)

FOREIGN PATENT DOCUMENTS

CN 103443381 A 12/2013
JP 8-188047 7/1996
(Continued)

OTHER PUBLICATIONS

International Search Report dated Apr. 26, 2016 in PCT/JP2016/055299, filed on Feb. 23, 2016 (With English Translation).
(Continued)

*Primary Examiner* — William P Watkins, III
(74) *Attorney, Agent, or Firm* — Oblon, McClelland, Maier & Neustadt, L.L.P.

(57) ABSTRACT

A curved cover glass includes a plate-like glass body having a first surface, a second surface facing the first surface and at least one end face. The plate-like glass body has an average thickness of 5 mm or less. Among tangential directions on the first surface at an arbitrary point, when an X-axis is assumed to be a direction in which a first curvature radius $R_1$ in cross-section of the first surface in an XZ plane is minimum, the first surface has a curvature part in which the surface is bent in the X-axis direction at least at one point on the first surface. The first curvature radius $R_1$ is 10,000 mm or less. The curvature part includes at least one opening or concave part extending from the first surface to the second surface.

56 Claims, 11 Drawing Sheets

(51) Int. Cl.
  *B28D 1/14* (2006.01)
  *C03B 23/03* (2006.01)
  *C03B 23/025* (2006.01)
  *B32B 3/26* (2006.01)
  *C03C 21/00* (2006.01)

(52) U.S. Cl.
  CPC .............. *C03B 23/03* (2013.01); *B32B 3/266* (2013.01); *C03C 21/002* (2013.01); *Y10T 428/24273* (2015.01)

(58) Field of Classification Search
  USPC .......................................................... 65/105
  See application file for complete search history.

(56) References Cited

U.S. PATENT DOCUMENTS

| | | | |
|---|---|---|---|
| 8,716,361 B2 * | 5/2014 | Mihara | ................. C08F 212/34 522/116 |
| 2012/0070624 A1 | 3/2012 | Payen et al. | |
| 2014/0144182 A1 | 5/2014 | Dannoux et al. | |

FOREIGN PATENT DOCUMENTS

| | | |
|---|---|---|
| JP | 11-247342 A | 9/1999 |
| JP | 3381905 | 3/2003 |
| JP | 2004-145674 | 5/2004 |
| JP | 2012-528062 | 11/2012 |
| JP | 2013-536795 | 9/2013 |
| WO | WO 01/07373 A1 | 2/2001 |

OTHER PUBLICATIONS

Written Opinion dated Apr. 26, 2016 in PCT/JP2016/055299, filed on Feb. 23, 2016.

* cited by examiner

CURVED COVER GLASS AND METHOD FOR MANUFACTURING SAME, AND GLASS MEMBER, DISPLAY DEVICE, AND CURVED GLASS

TECHNICAL FIELD

The present invention relates to a curved cover glass, a method for manufacturing the same, a glass member, a display device, and a curved glass, which are used for the purpose of enhancing the protection and aesthetic appearance of automotive interior parts or a display unit screen.

BACKGROUND ART

In recent years, with a view to enhancing the protection or aesthetic appearance of automotive interior parts, a thin plate-like cover glass is disposed in front of an automotive interior component. Specific examples of the automotive interior component using an in-vehicle cover glass include an instrument panel, a head-up display (HUD), a dashboard, a center console, and a shift knob.

In addition, a cover glass for enhancing the protection and aesthetic appearance of a screen, i.e., a display, is often used also in a mobile device such as tablet PC (Personal Computer) and smartphone (hereinafter, sometimes referred to as "smartphone, etc.") or a display unit such as liquid crystal television (liquid crystal panel), organic EL panel and touch panel (hereinafter, in the present description, these are collectively referred to as "display unit, etc.").

In order to realize requirements in terms of design, for example, improvement of design property, impartation of high-grade feel, and conformability to interior design or main body design, the portion in which the above-described cover glass of an automotive interior component or a display unit, etc. is disposed sometimes takes on a three-dimensional shape. In this case, the cover glass used is also preferably a curved glass having an outer shape being a three-dimensional shape.

In the case where the cover glass is planar, when an adhesive is used, the cover glass can be easily and unfailingly fixed to the front surface of an automotive interior component or the screen of a display unit. In this case, considering the visibility, workability, ease of fixing, etc., only the outer periphery of the cover glass defining the outer side of the (effective) screen of a display unit, etc. is fixed with an adhesive.

However, in the case of using the curved glass as a cover glass, when only the outer periphery of the cover glass is fixed with an adhesive, the cover glass may not be reliably fixed. This is because, depending on the forming accuracy of the curved glass, a load is applied to the adhesive used for fixing and gradual separation of the cover glass occurs.

In the building material field, there is a method called a DPG method, where a connecting mechanism such as special hinge bolt is inserted into an opening provided in a sheet glass so as to support and fix the sheet glass (see, Patent Document 1).

In the case of using the curved glass as a cover glass, when the procedure above is applied as the means for fixing the cover glass, an opening is difficult to be formed in the curved glass, or the glass may be broken during forming an opening.

PRIOR ART LITERATURE

Patent Document

Patent Document 1: Japanese Patent No. 3381905

SUMMARY OF THE INVENTION

Technical Problems

In order to solve the above-described problems of conventional techniques, an object of the present invention is to provide a curved cover glass, a method for manufacturing the same, a glass member, a display device, and a curved glass, ensuring that fixing to an automotive interior component or a display unit can be easily and reliably achieved.

Solution to Problems

The present invention includes the following aspects in order to achieve the above problem(s).

(1) A curved cover glass comprising a plate-like glass body having:
a first surface;
a second surface facing the first surface; and
at least one end face connecting the first surface and the second surface,
the plate-like glass body having an average thickness $t_{ave}$ of 5 mm or less, wherein:
when a tangential direction from an arbitrary point on the first surface is assumed to be an X-axis and among tangential directions from the center of the first surface, a direction orthogonal to the X-axis is assumed to be a Y-axis, and a direction orthogonal to the X-axis and the Y-axis is assumed to be a Z-axis,
the X-axis is, among tangential directions on the first surface at an arbitrary point on the first surface, a direction in which a first curvature radius $R_1$ in cross-section of the first surface in an XZ plane passing the X-axis and the Z-axis is minimum,
the first surface has a curvature part in which the surface is bent in the X-axis direction at least at one point on the first surface and the first curvature radius $R_1$ is 10,000 mm or less, and
the plate-like glass body comprises at least one opening extending from the first surface to the second surface.

(2) A curved cover glass comprising a plate-like glass body having:
a first surface;
a second surface facing the first surface; and
at least one end face connecting the first surface and the second surface,
the plate-like glass body having an average thickness $t_{ave}$ of 5 mm or less, wherein:
when a tangential direction from an arbitrary point on the first surface is assumed to be an X-axis and among tangential directions from the center of the first surface, a direction orthogonal to the X-axis is assumed to be a Y-axis, and a direction orthogonal to the X-axis and the Y-axis is assumed to be a Z-axis,
the X-axis is, among tangential directions on the first surface at an arbitrary point on the first surface, a direction in which a first curvature radius $R_1$ in cross-section of the first surface in an XZ plane passing the X-axis and the Z-axis is minimum, the first surface has a curvature part in which the surface is bent in the X-axis direction at least at one point on the first surface and the first curvature radius $R_1$ is 10,000 mm or less, and the curvature part comprises at least one opening extending from the first surface to the second surface.

(7) A curved cover glass comprising a plate-like glass body having:

a first surface;

a second surface facing the first surface; and at least one end face connecting the first surface and the second surface, the plate-like glass body having an average thickness $t_{ave}$ of 5 mm or less, wherein:

when a tangential direction from an arbitrary point on the first surface is assumed to be an X-axis and among tangential directions from the center of the first surface, a direction orthogonal to the X-axis is assumed to be a Y-axis, and a direction orthogonal to the X-axis and the Y-axis is assumed to be a Z-axis, the X-axis is, among tangential directions on the first surface at an arbitrary point on the first surface, a direction in which a first curvature radius $R_1$ in cross-section of the first surface in an XZ plane passing the X-axis and the Z-axis is minimum, the first surface has a curvature part in which the surface is bent in the X-axis direction at least at one point on the first surface and the first curvature radius $R_1$ is 10,000 mm or less, and the plate-like glass body comprises at least one concave part having, as a two-dimensional projected shape, a substantially circular shape, a substantially oval shape, a substantially semicircular shape or a substantially semi-oval shape, with a maximum length in the two-dimensional projected shape being from 1.5 to 200 mm.

(4) A curved cover glass comprising a plate-like glass body having:

a first surface;

a second surface facing the first surface; and at least one end face connecting the first surface and the second surface, the plate-like glass body having an average thickness $t_{ave}$ of 5 mm or less, wherein:

when a tangential direction from an arbitrary point on the first surface is assumed to be an X-axis and among tangential directions from the center of the first surface, a direction orthogonal to the X-axis is assumed to be a Y-axis, and a direction orthogonal to the X-axis and the Y-axis is assumed to be a Z-axis, the X-axis is, among tangential directions on the first surface at an arbitrary point on the first surface, a direction in which a first curvature radius $R_1$ in cross-section of the first surface in an XZ plane passing the X-axis and the Z-axis is minimum, the first surface has a curvature part in which the surface is bent in the X-axis direction at least at one point on the first surface and the first curvature radius $R_1$ is 10,000 mm or less, and the curvature part comprises at least one concave part having, as a two-dimensional projected shape, a substantially circular shape, a substantially oval shape, a substantially semicircular shape or a substantially semi-oval shape, with a maximum length in the two-dimensional projected shape being from 1.5 to 200 mm.

(5) A glass member comprising the curved cover glass according to the above (1) or (2) and a housing, wherein the housing has at least one connecting mechanism passing through and fitting into the opening of the curved cover glass to connect the curved cover glass and the housing.

(6) A glass member comprising the curved cover glass according to the above (3) or (4) and a housing, wherein the housing has at least one connecting mechanism mating with the concave part of the curved cover glass to connect the curved cover glass and the housing.

(7) A display device comprising the curved cover glass according to any one of the above (1) to (4) and a display unit.

(8) A method for manufacturing the curved cover glass as described in the above (1) or (2), the method comprising:

forming the opening by causing a drill comprising a grindstone in a cutting part to rotate around an axis of rotation and move orbitally around an axis extending from the first surface to the second surface in a spiral manner.

(9) A method for manufacturing the curved cover glass as described in the above (3) or (4), the method comprising:

forming the concave part by causing a drill comprising a grindstone in a cutting part to rotate around an axis of rotation and move orbitally around an axis extending from the first surface to the second surface in a spiral manner.

(10) A curved glass comprising a plate-like glass body having:

a first surface;

a second surface facing the first surface; and at least one end face connecting the first surface and the second surface, the plate-like glass body having an average thickness $t_{ave}$ of 5 mm or less, wherein:

when a tangential direction from an arbitrary point on the first surface is assumed to be an X-axis and among tangential directions from the center of the first surface, a direction orthogonal to the X-axis is assumed to be a Y-axis, and a direction orthogonal to the X-axis and the Y-axis is assumed to be a Z-axis, the X-axis is, among tangential directions on the first surface at an arbitrary point on the first surface, a direction in which a first curvature radius $R_1$ in cross-section of the first surface in an XZ plane passing the X-axis and the Z-axis is minimum, the first surface has a curvature part in which the surface is bent in the X-axis direction at least at one point on the first surface and the first curvature radius $R_1$ is 10,000 mm or less, and the plate-like glass body comprises at least one opening extending from the first surface to the second surface.

(11) A curved glass comprising a plate-like glass body having:

a first surface;

a second surface facing the first surface; and at least one end face connecting the first surface and the second surface, the plate-like glass body having an average thickness $t_{ave}$ of 5 mm or less, wherein:

when a tangential direction from an arbitrary point on the first surface is assumed to be an X-axis and among tangential directions from the center of the first surface, a direction orthogonal to the X-axis is assumed to be a Y-axis, and a direction orthogonal to the X-axis and the Y-axis is assumed to be a Z-axis, the X-axis is, among tangential directions on the first surface at an arbitrary point on the first surface, a direction in which a first curvature radius $R_1$ in cross-section of the first surface in an XZ plane passing the X-axis and the Z-axis is minimum, the first surface has a curvature part in which the surface is bent in the X-axis direction at least at one point on the first surface and the first curvature radius $R_1$ is 10,000 mm or less, and the plate-like glass body comprises at least one concave part having, as a two-dimensional projected shape, a substantially circular shape, a substantially oval shape, a substantially semicircular shape or a substantially semi-oval shape, with a maximum length in the two-dimensional projected shape being from 1.5 to 200 mm.

Advantageous Effects of the Invention

In the present invention, an opening or a concave part is provided in a curvature part or a flat part, so that when a connecting mechanism is passed through and fitted into the opening or concave part, fixing to an automotive interior member or a display unit, etc. can be easily and reliably achieved.

BRIEF DESCRIPTION OF THE DRAWINGS

FIG. 9A is a partial perspective view thereof, and FIG. 9B is a partial side cross-sectional view thereof.

FIG. 10A is a partial perspective view thereof, and FIG. 10B is a partial side cross-sectional view thereof.

FIG. 11A is a partial perspective view thereof, and FIG. 11B is a partial side cross-sectional view thereof.

FIG. 12A is a partial perspective view thereof, and FIG. 12B is a partial side cross-sectional view thereof.

FIG. 13A is a partial perspective view thereof, and FIG. 13B is a partial side cross-sectional view thereof.

DESCRIPTION OF EMBODIMENTS

Several embodiments of the curved cover glass or curved glass of the present invention and the glass member of the present invention are described below. The curved cover glass or curved glass of the present invention and the glass member of the present invention are not limited to these embodiments. In the following description of the embodiment, the present invention is described by taking a curved cover glass as an example, but the curved cover glass may be replaced by a curved glass that is not limited to the above-described cover applications, or a bent glass having a curvature part at least in one place.

Figure 1:
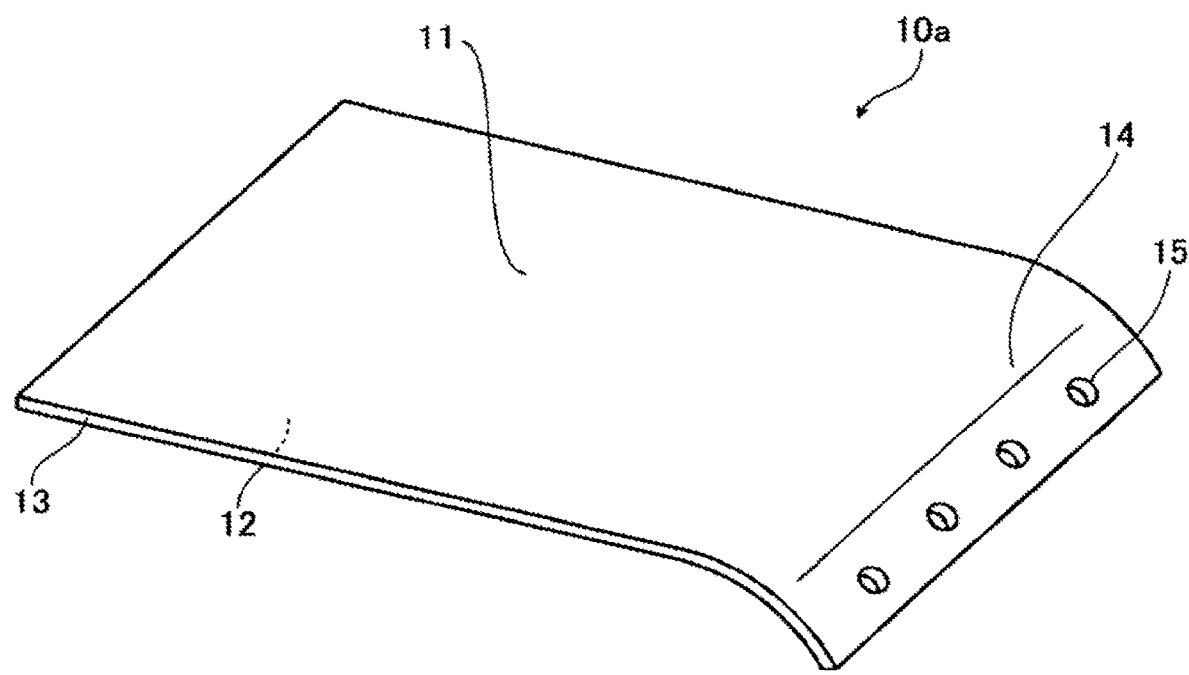
FIG. 1 is a perspective view for explaining the curved cover glass or curved glass of the present embodiment.

FIG. 1 is a diagram for explaining the curved cover glass of the present embodiment. As illustrated in FIG. 1, the curved cover glass of the present embodiment is composed of a plate-like glass body 10a having a first surface 11, a second surface 12 facing the first surface 11, and at least one end face 13 connecting the first surface 11 and the second surface 12. The plate-like glass body 10a as used in the present description means a plate-like body in which the dimensions of the first surface 11 and the second surface 12 are larger compared with the thickness of the end face 13, and does not mean a planar sheet glass. The plate-like glass body 10a constituting the curved cover glass of the present embodiment has a curvature part 14, and at least one opening 15 (in the embodiment illustrated, four openings 15) is provided in the curvature part 14. The opening 15 extends from the first surface 11 to the second surface 12 of the plate-like glass body 10a.

Out of two main surfaces of the plate-like glass body, which main surface should be taken as the first or second surface is not particularly limited, but in the case of use as a cover glass of an automotive interior component or a display unit, etc., the surface on the externally exposed side, i.e., the surface on the side working out to a screen, is taken as the first surface of the plate-like glass body. In this case, the surface facing the screen of an automotive interior component or a display unit, etc. is the second surface of the plate-like glass body. In the state of the screen side of an automotive interior component or a display unit, etc. being arranged to face the second surface of the plate-like glass body, a connecting mechanism provided in a housing of an automotive interior component or a display unit, etc. is passed through and fitted into the opening 15 of the plate-like glass body 10a constituting the curved cover glass, and the plate-like glass body 10a constituting the curved cover glass and the housing of an automotive interior component or a display unit, etc. are thereby connected.

Figure 2:
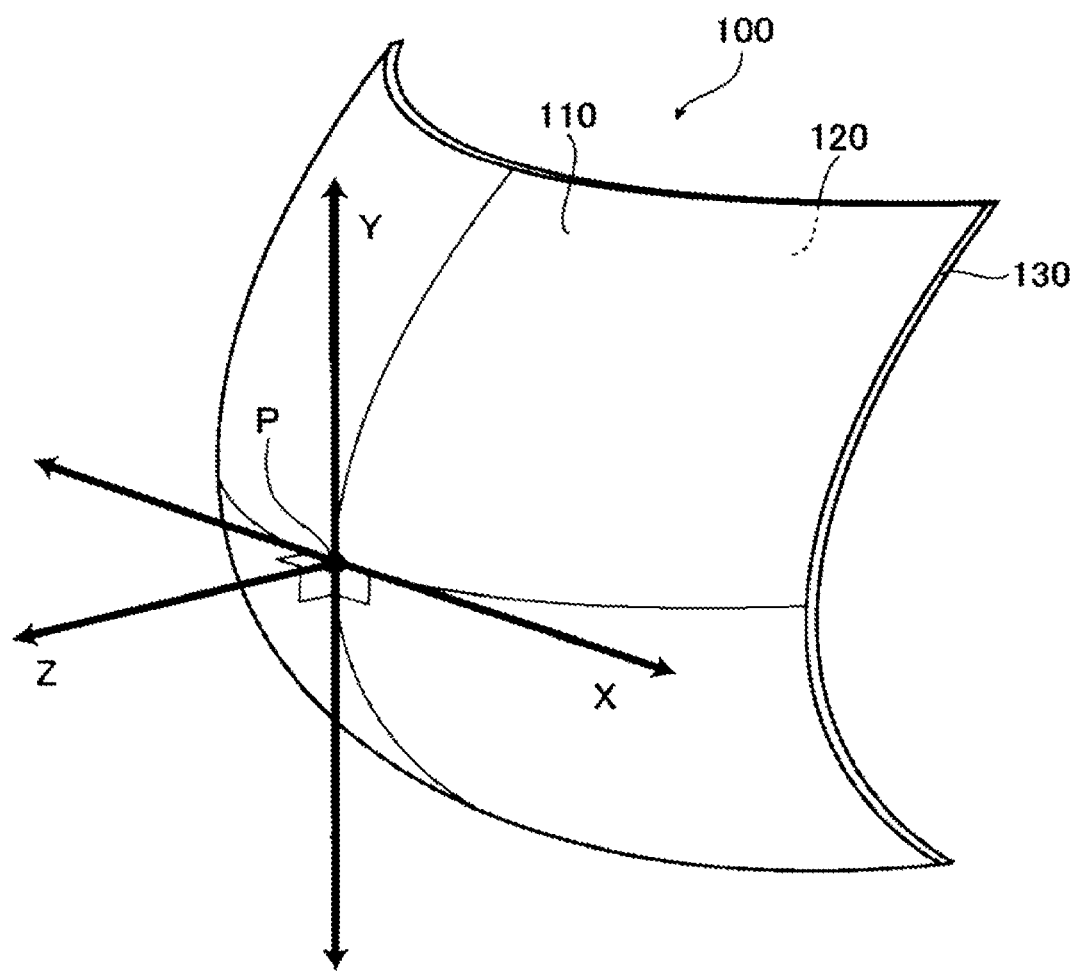
FIG. 2 is a diagram for explaining the curvature part in the present invention.

FIG. 2 is a diagram for explaining the curvature part in the present invention and illustrates a curved cover glass. However, the curved cover glass illustrated in FIG. 2 is not the curved cover glass of the present embodiment, because an opening is not provided in the curvature part. The curved cover glass illustrated in FIG. 2 is composed of a plate-like glass body 100 having a first surface 110, a second surface 120 facing the first surface 110 and at least one end face 130 connecting the first surface 110 and the second surface 120. In the present invention, in order to specify the later-described curvature part, among tangential directions on the first surface at an arbitrary point P on the first surface 110 of the plate-like glass body constituting the curved cover glass, a tangential direction selected to satisfy the following conditions is assumed to be an X-axis, and among tangential directions on the first surface at the point P on the first surface, a direction orthogonal to the X-axis is assumed to be a Y-axis, and a direction orthogonal to the X-axis and the Y-axis is assumed to be a Z-axis. Here, the X-axis is, among tangential directions on the first surface at the arbitrary point P on the first surface of the plate-like glass body, a direction in which the curvature radius (hereinafter, sometimes referred to as the first curvature radius) $R_1$ in cross-section of the first surface of the plate-like glass body in an XZ plane passing the X-axis and the Z-axis is minimum. In the case of having a plurality of directions in which $R_1$ is minimum, the first curvature radius $R_1$ may be determined by taking at least one of those directions as the X-axis. In this case, the first curvature radius $R_1$ is preferably determined by taking, as the X-axis, a direction in which the later-described second curvature radius $R_2$ is minimum.

The first surface of the plate-like glass body constituting the curved cover glass has a curvature part in which the surface is bent in the X-axis direction at least at one point on the first surface. The curvature part indicates a region in which the first curvature radius $R_1$ in the XZ plane at an arbitrary point P on the first surface is 10,000 mm or less. In FIG. 2, the entire first surface 110 forms a curvature part.

In the case of having a curvature part in which the first curvature radius $R_1$ is 10,000 mm or less, when the cover glass is used as a cover glass of an automotive interior member or a display unit, etc., since the portion disposed on the screen thereof is appropriately bent, the viewing angle for the user is small and in turn, the visibility is enhanced.

From the viewpoint of enhancing the visibility, the first curvature radius $R_1$ of the curvature part is preferably from 300 to 3,000 mm, more preferably from 500 to 2,000 mm.

As illustrated in FIG. 2, the surface in the curvature part of the plate-like glass body constituting the curved cover glass may be bent also in the Y-axis direction at least at one point in the curvature part. In this case, the curvature radius (hereinafter, sometimes referred to as second curvature radius) $R_2$ in cross-section of the first surface of the plate-like glass body in the YZ plane passing the Y-axis and the Z-axis is preferably 10,000 mm or less, more preferably from 300 to 3,000 mm, still more preferably from 500 to 2,000 mm. As described above, out of tangential directions on the first surface at an arbitrary point P on the first surface of the plate-like glass body, a direction in which the first curvature radius $R_1$ is minimum is taken as the X-axis and therefore, the first curvature radius $R_1$ and the second curvature radius $R_2$ satisfy the relation of $R_1 \leq R_2$.

In the curved cover glass of the present embodiment, the thickness t of the plate-like glass body constituting the curved cover glass is required to be small for the following reasons. First, reduction in the thickness t leads to decrease in the mass of the curved cover glass. In addition, since the absorbancy in the thickness direction of the curved cover glass is proportional to the thickness t, reduction in the thickness t therefore makes it possible to decrease the absorbancy and increase the visible light transmittance in the thickness direction of the curved cover glass, and as a result, the visibility is enhanced.

Figure 3:
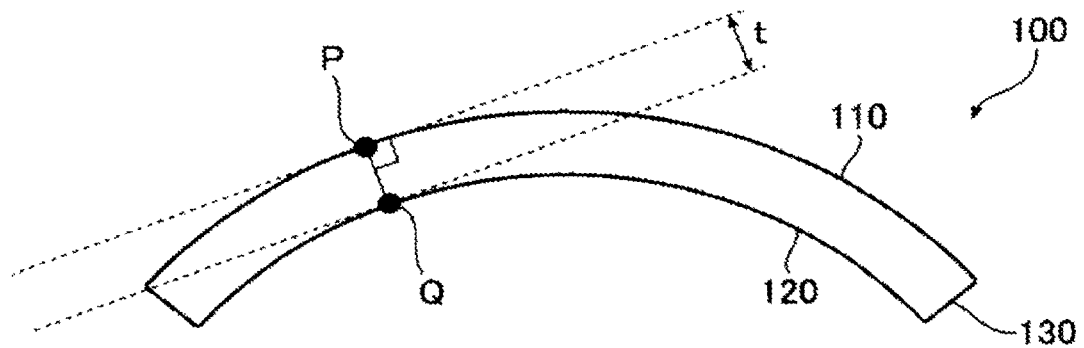
FIG. 3 is a diagram for explaining the thickness of a plate-like glass body constituting the curved cover glass or curved glass.

FIG. 3 is a diagram for explaining the thickness t of a plate-like glass body constituting the curved cover glass. However, the curved cover glass illustrated in FIG. 3 is not the curved cover glass of the present embodiment, because an opening is not provide in the curvature part.

The plate-like glass body 100 illustrated in FIG. 3 has a first surface 110, a second surface 120 facing the first surface 110, and at least one end face 130 connecting the first surface 110 and the second surface 120.

In the present description, as illustrated in FIG. 3, the thickness t of the plate-like glass body at an arbitrary point P on the first surface is defined as a shortest distance connecting an arbitrary point P on the first surface 110 to an intersection point Q of a normal line to the first surface 110 at the point P and the second surface 120 of the plate-like glass body.

In the curved cover glass of the present embodiment, the average thickness $t_{ave}$ of the plate-like glass body constituting the curved cover glass is 5 mm or less. In view of weight reduction and sensing of a touch panel, etc., the average thickness $t_{ave}$ of the plate-like glass body constituting the curved cover glass is preferably 2 mm or less, more preferably 1.5 mm or less, still more preferably 1.0 mm or less, yet still more preferably 0.7 mm or less.

The curve cover glass of the present embodiment preferably exhibits less variation in the thickness tin the curvature part of the plate-like glass body constituting the curved cover glass, because variation of the transmittance, etc. of the plate-like glass body is suppressed and the visibility is enhanced.

More specifically, the ratio $t_{max}/t_{min}$ between the maximum value $t_{max}$ and the minimum value $t_{min}$ of the thickness in the curvature part of the plate-like glass body is preferably from 1.0 to 1.5, more preferably from 1.0 to 1.1.

Figure 4:
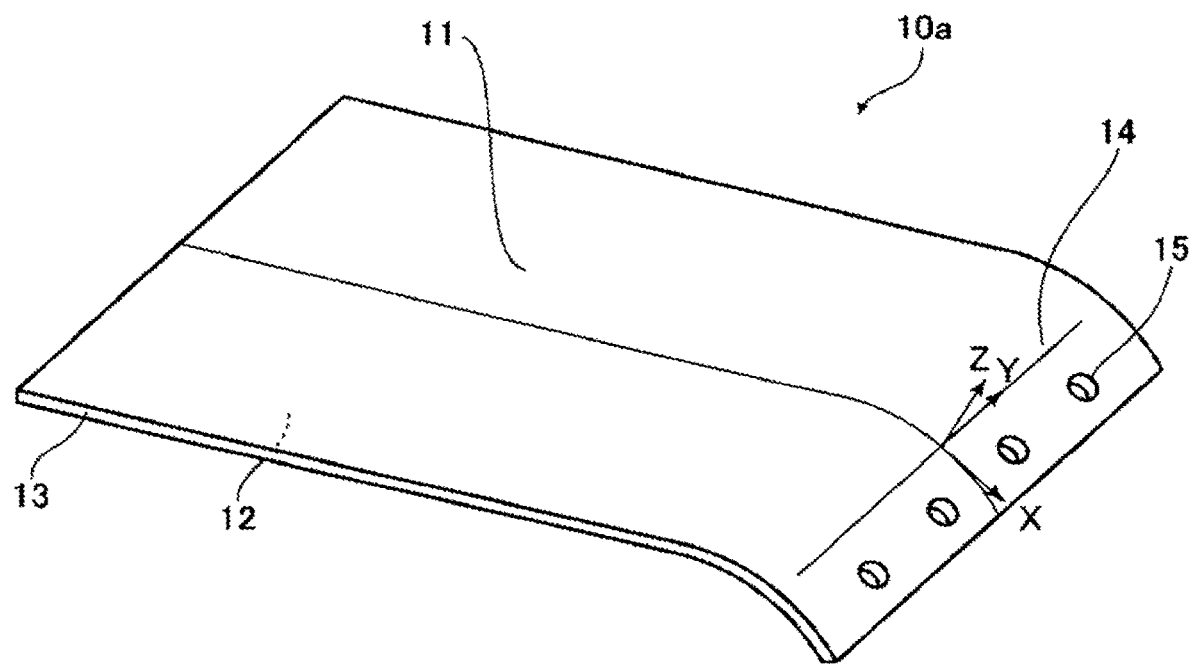
FIG. 4 is a diagram illustrating one configuration example of the curved cover glass or curved glass of the present embodiment.

FIG. 4 is a diagram illustrating one configuration example of the curved cover glass of the present embodiment. The curved cover glass illustrated in FIG. 4 is composed of a plate-like glass body 10a having a first surface 11, a second surface 12 facing the first surface 11, and at least one end face 13 connecting the first surface 11 and the second surface 12. In FIG. 4, similarly to FIG. 2, an arbitrary point P on the first surface 11 of the plate-like glass body 10a and an X-axis, a Y-axis and Z-axis determined by the point P are illustrated. In the plate-like glass body 10a illustrated in FIG. 4, within the first surface 11, only a portion close to the end face on the right side in the figure forms a curvature part 14.

In the present description, a portion having a first curvature radius $R_1$ of more than 10,000 mm is referred to as a non-bent, substantially flat part, and a portion having a curvature radius of less than 300 mm is referred to as a specific curvature part. In the plate-like glass body 10a illustrated in FIG. 4, within the first surface 11, portions except for the portion forming the curvature part 14 close to the end face on the right side in the figure are a substantially flat part.

In the curved cover glass according of the present embodiment, from the viewpoint of enhancing the visibility when used as a cover glass of an automotive interior component or a display unit, etc., the plate-like glass body constituting the curved cover glass preferably has a curvature part at least at one arbitrary point in the first surface in a portion adjacent to the end face or at one arbitrary point in the first surface within 100 mm from the end face. The former is a case where the curvature part on the first surface is connected to the end face, and the latter is a case where the curvature part on the first surface is not connected to the end face. In the latter, a substantially flat part or a specific curvature part is present between the curvature part on the first surface and the end face. In the latter case, it is more preferable to have a curvature part at one arbitrary point within 50 mm from the end face, and it is still more preferable to have a curvature part at one arbitrary point within 30 mm from the end face.

In the curved cover glass of the present embodiment, from the viewpoint of preventing breakage of the plate-like glass body 10a constituting the curved cover glass, the opening 15 provided in the curvature part 14 is preferably provided at a position 5 mm or more away from the end face of the first surface 11.

The opening 15 provided in the curvature part 14 is more preferably provided at a position 10 mm or more, still more preferably 20 mm or more, away from the end face of the first surface 11.

In the curved cover glass illustrated in FIG. 4, the dimension of the plate-like glass body 10a constituting the curved cover glass is 600 mm×250 mm×1 mm (average thickness $t_{ave}$). The curvature part 14 is bent only in the above-defined X-axis direction in order for the first surface 11 to form a convex surface, where the first curvature radius $R_1$ is 500 mm. In the curvature part 14, four openings 15 are formed to align at equal intervals in the Y-axis direction. The maximum diameter d in a two-dimensional projected shape of the opening 15 is 50 mm.

In the curved cover glass of the present embodiment, from the viewpoint of preventing breakage of the plate-like glass body 10a constituting the curved cover glass, the maximum diameter d in a two-dimensional projected shape of the opening 15 is preferably 50 mm or less.

Figure 5:
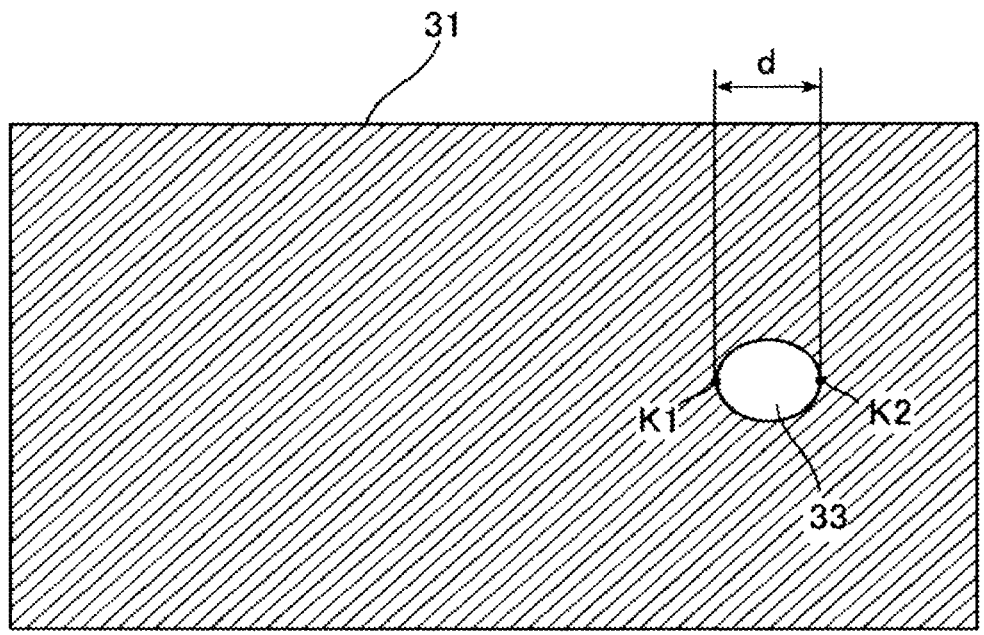
FIG. 5 is an explanatory diagram illustrating a plan view obtained by projecting the first surface of a plate-like glass body constituting the curved cover glass onto a two-dimensional plane from an arbitrary direction.

The maximum diameter d in a two-dimensional projected shape of the opening 15 is more preferably 30 mm or less, still more preferably 10 mm or less. FIG. 5 is an explanatory diagram illustrating a plan view obtained by projecting the first surface of a plate-like glass body constituting the curved cover glass onto a two-dimensional plane from an arbitrary direction.

The maximum diameter d in a two-dimensional projected shape of the opening 15 indicates, as illustrated in FIG. 5, a maximum straight line length out of straight lines connecting arbitrary two points K1 and K2 on the contour in a plan view corresponding to the opening 15, with respect to a plan view in which the area of a region 33 corresponding to the opening 15 is largest among plan views 31 obtained by projecting the surface.

Here, in the case of forming the opening 15 by the later-described procedure in a plate-like glass body 10a constituting the curved cover glass, the two-dimensional projected shape of the opening 15 is a substantially circular shape, a substantially oval shape, a substantially semicircular shape or a substantially semi-oval shape.

In addition, the maximum diameter d in a two-dimensional projected shape of the opening 15 may differ between the first surface 11 side and the second surface 12 side. In this case, the opening 15 forms a tapered shape differing in the maximum diameter d in the thickness direction of the plate-like glass body 10a.

Figure 6:
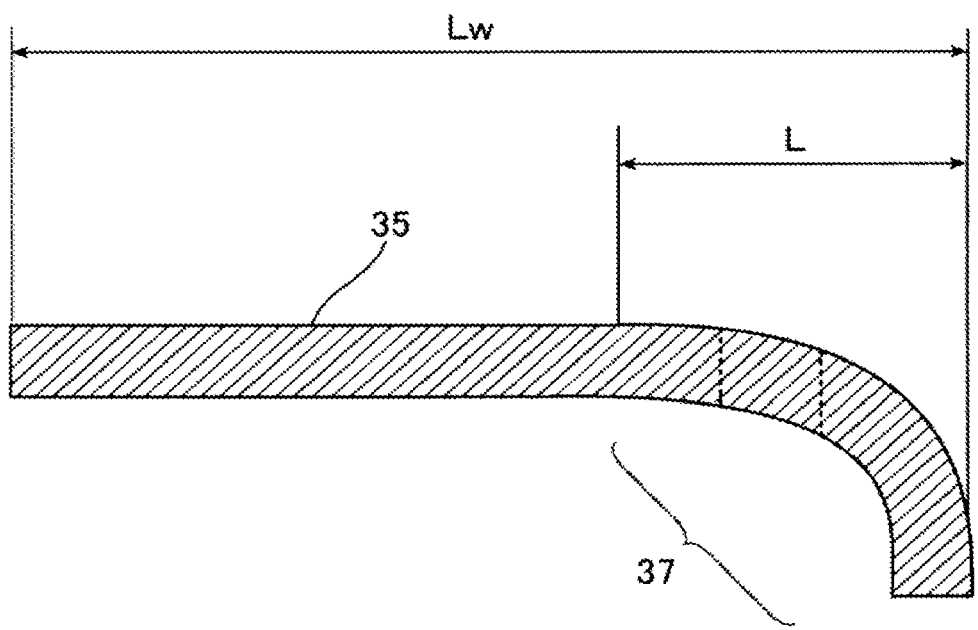
FIG. 6 is an explanatory diagram illustrating a plan view obtained by projecting a plate-like glass body constituting the curved cover glass from a direction parallel to the first surface.

FIG. 6 is an explanatory diagram illustrating a plan view obtained by projecting a plate-like glass body constituting the curved cover glass from a direction parallel to the first surface. As illustrated in FIG. 6, in the curved cover glass of the present embodiment, the two-dimensional projected shape 35 of the first surface 11 of a plate-like glass body 10a having a length of Lw has a region 37 corresponding to the curvature part 14. The maximum length of the region 37 is designated as L (mm). From the viewpoint of preventing breakage of the plate-like glass body 10a constituting the curved cover glass, the ratio d/L of the maximum diameter d (mm) of the opening 15 in a two-dimensional projected shape to the maximum length L (mm) is preferably 0.6 or less.

The ratio d/L of the maximum diameter d of the opening 15 in a two-dimensional projected shape to the maximum length L of the curvature part 14 is more preferably 0.5 or less, still more preferably 0.4 or less.

Figure 7A:
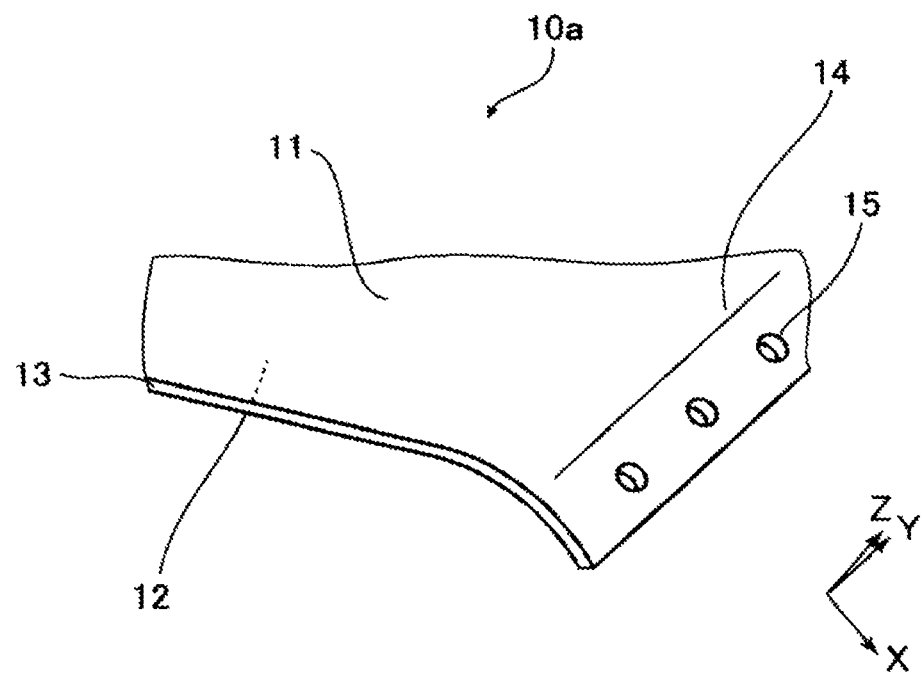
FIG. 7A is a partial perspective view of the curved cover glass or curved glass illustrated in FIG. 4.
Figure 7B:
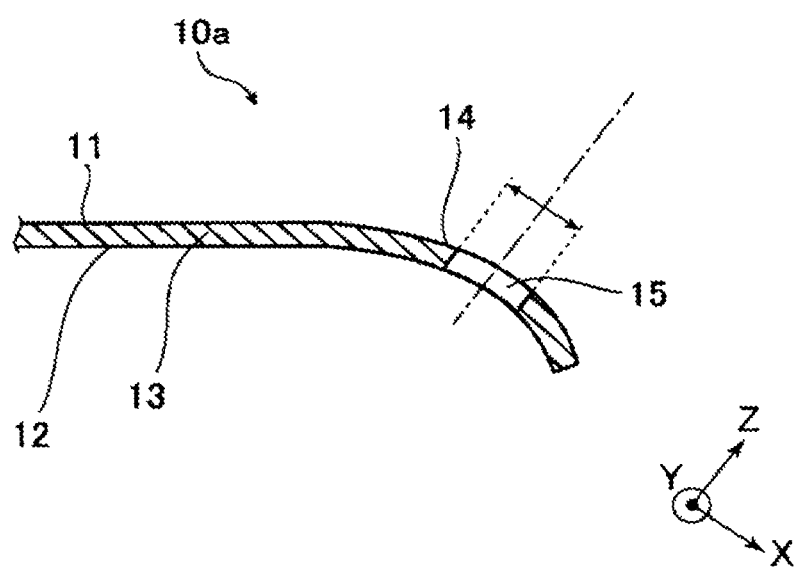
FIG. 7B is a partial side cross-sectional view of the curved cover glass or curved glass illustrated in FIG. 4.

FIG. 7A is a partial perspective view of the curved cover glass illustrated in FIG. 4, and FIG. 7B is a partial side cross-sectional view of the curved cover glass illustrated in FIG. 4. As illustrated in FIG. 7B, the opening 15 provided in the curvature part 14 extends from the first surface 11 to the second surface 12 of the plate-like glass body 10a. In FIG. 7B, the axis of the opening 15 extending from the first surface 11 to the second surface 12 coincides with a normal line of the first surface 11 in a portion in which the opening 15 is provided, but the configuration is not limited thereto, and both may not coincide.

Figure 8:
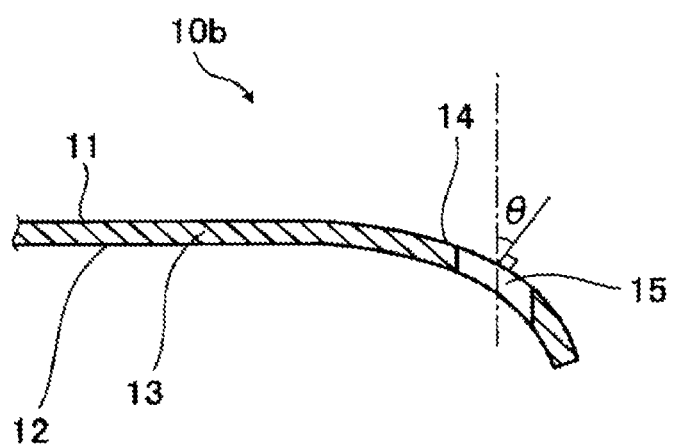
FIG. 8 is a partial side cross-sectional view illustrating another configuration example of the curved cover glass or curved glass of the present embodiment.

FIG. 8 is a partial side cross-sectional view illustrating another configuration example of the curved cover glass of the present embodiment. In the curved cover glass illustrated in FIG. 8, the direction of the opening 15 provided in the curvature part 14 of a plate-like glass body 10b constituting the curved cover glass differs from that in the plate-like glass body 10a illustrated in FIG. 7B. The plate-like glass body 10b illustrated in FIG. 8 is tilted with respect to both the axis of the opening 15 extending from the first surface 11 to the second surface 12 and the normal line of the first surface 11 in a portion having provided therein the opening 15.

One of the reasons for providing an opening in the curvature part defined above in the curved cover glass of the present embodiment is, in the case of use as a cover glass of an automotive interior member or a display unit, etc., to pass/fit a connecting mechanism, such as bolt and angle, through/into the opening provided in the curvature, thereby connecting a housing of an automotive interior member or a display unit, etc. to the plate-like glass body constituting the curved cover glass.

In the present description, members formed by connecting a housing of an automotive interior member or a display unit, etc. to a plate-like glass body constituting the curved cover glass are collectively referred to as the glass member of the present invention.

However, the reason for providing an opening in the above-defined curvature part in the curved cover glass of the present embodiment is not limited thereto. For example, in the case of use as a cover glass of an automotive interior member or a display device such as display unit, the opening may be provided as a hole having a function such as speaker, switch, vent hole, storage area and slot area.

In the case of passing/fitting a connecting mechanism through/into an opening provided in the curvature part to connect a housing of an automotive interior member or a display unit, etc. to a plate-like glass body constituting the curved cover glass, the angle θ formed by an axis of the opening 15 extending from the first surface 11 to the second surface 12 and a normal line of the first surface 11 in a portion in which the opening 15 is provided is not particularly limited but is 0°≤θ≤60°, preferably 5°≤θ≤60°. The angle θ is more preferably 10°≤θ≤45°, still more preferably 15°≤θ≤30°.

Figure 9A:
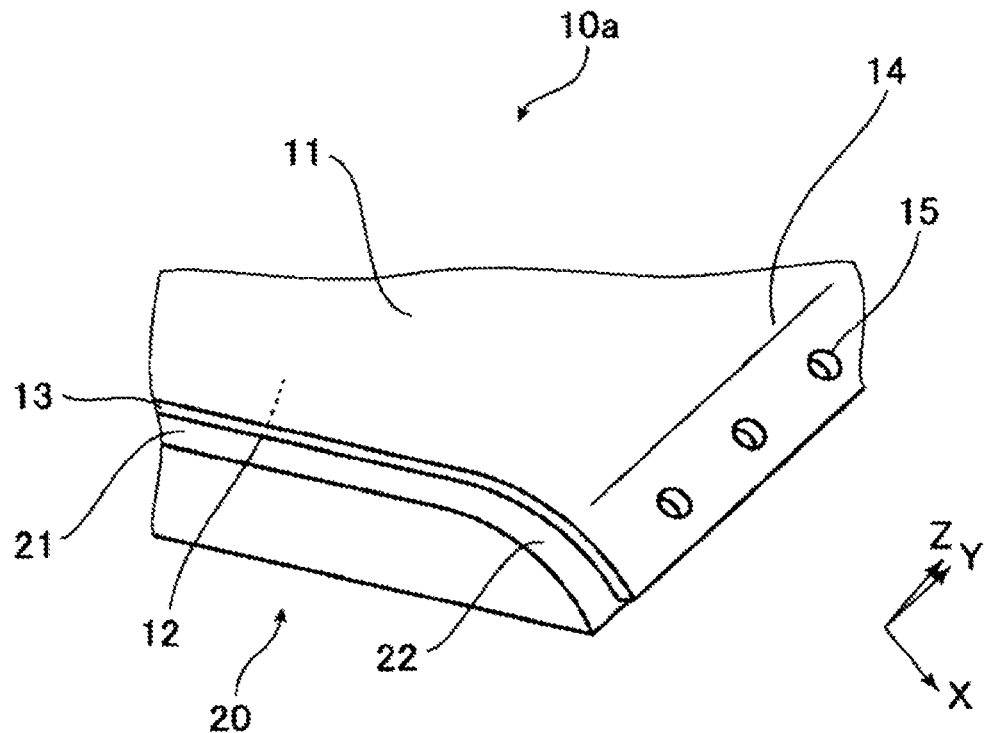
FIG. 9A and FIG. 9B are diagrams illustrating one configuration example of the glass member of the present embodiment.
Figure 9B:
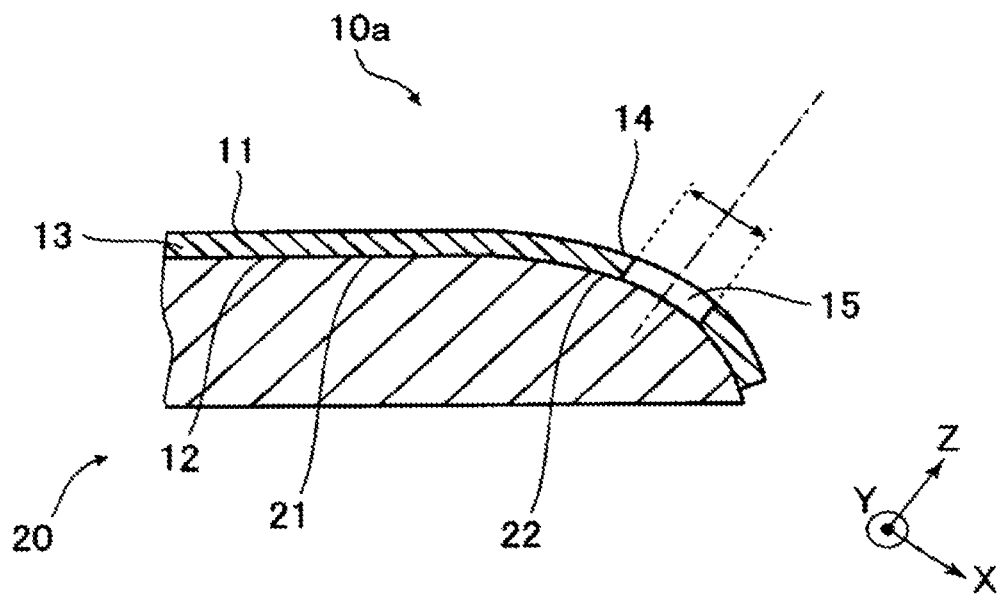

FIG. 9A and FIG. 9B are a diagram illustrating one configuration example of the glass member of the present embodiment, FIG. 9A is a partial perspective view thereof, and FIG. 9B is a partial side cross-sectional view thereof. In the glass member illustrated in FIG. 9A and FIG. 9B, a curved cover glass (a plate-like glass body 10a constituting the curved cover glass) illustrated in FIG. 7A and FIG. 7B and a housing 20 of an automotive interior member or a display unit, etc. are connected. However, in FIG. 9A, the plate-like glass body 10a constituting the curved cover glass and the housing 20 are depicted in the state of being put apart from each other so as to clearly show the positional relationship of both.

In FIG. 9A and FIG. 9B, the second surface 12 of the plate-like glass body 10a constituting the curved cover glass and the screen 21 side of the housing 20 of an automotive interior member or a display unit, etc. are arranged to face each other. Within the screen 21 of the housing 20, the portion facing the curvature part 14 of the plate-like glass body 10a has a curvature part 22.

In FIG. 9A and FIG. 9B, a connecting mechanism (not shown) is passed through and fitted into the opening 15 provided in the curvature part 14 of the plate-like glass body 10a constituting the curved cover glass, whereby the housing 20 of an automotive interior member or a display unit, etc. can be connected to the plate-like glass body 10a constituting the curved cover glass.

In FIG. 9A and FIG. 9B, from the viewpoint of enhancing the visibility, it is preferred that the shape of the second surface 12 of the plate-like glass body 10a constituting the curved cover glass conforms to the shape of the screen 21 of the housing 20 of an automotive interior member or a display unit, etc.

In the curved cover glass of the present embodiment, as described above, the thickness t of the plate-like glass body constituting the curved cover glass is small and in turn, the difference between the curvature radius (first curvature radius $R_1$, second curvature radius $R_2$) in the curvature part on the first surface and the curvature radius on the second surface facing the first surface is small. Accordingly, the curvature radius (first curvature radius $R_1$, second curvature radius $R_2$) in the curvature part on the first surface of the plate-like glass body constituting the curved cover glass can provide an indicator for judging whether the shape of the screen of the housing of an automotive interior member or a display unit, etc. conforms to the shape of the second surface of the plate-like glass body constituting the curved cover glass. The absolute value of the difference between the first curvature radius $R_1$ at an arbitrary point P in the curvature part on the first surface of the plate-like glass body constituting the curved cover glass and the curvature radius in the same direction as the first curvature radius $R_1$ at the point facing the point P in a portion on the screen of the housing of an automotive interior member or a display unit, etc. is preferably 10% or less, more preferably 5% or less, still more preferably 3% or less, of the first curvature radius $R_1$.

Figure 10A:
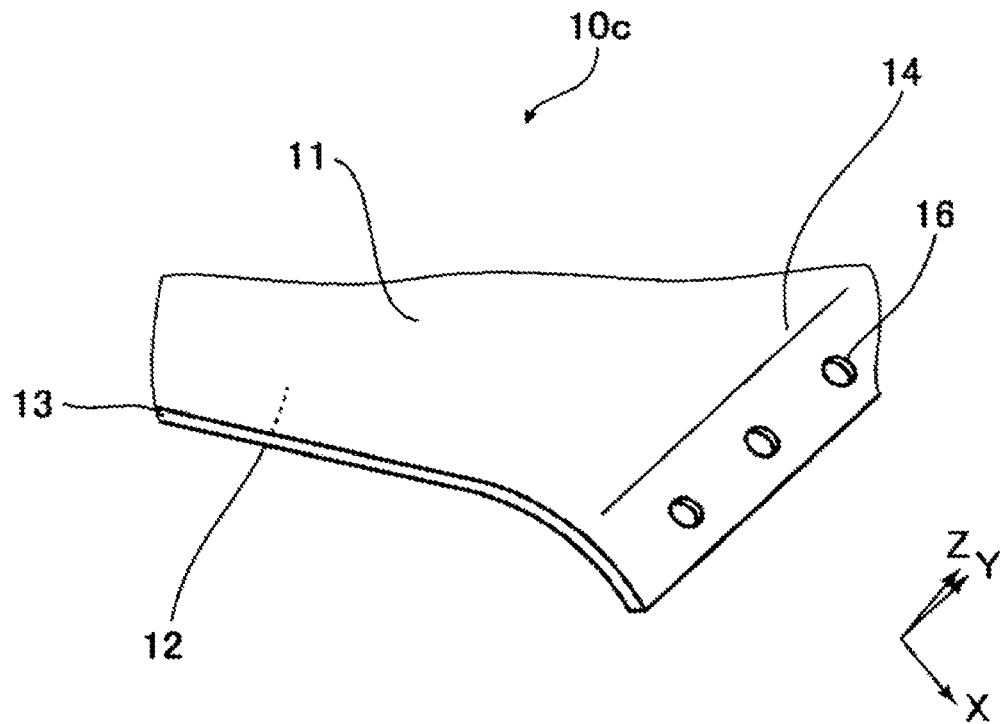
FIG. 10A and FIG. 10B are diagrams illustrating another configuration example of the curved cover glass or curved glass of the present embodiment.
Figure 10B:
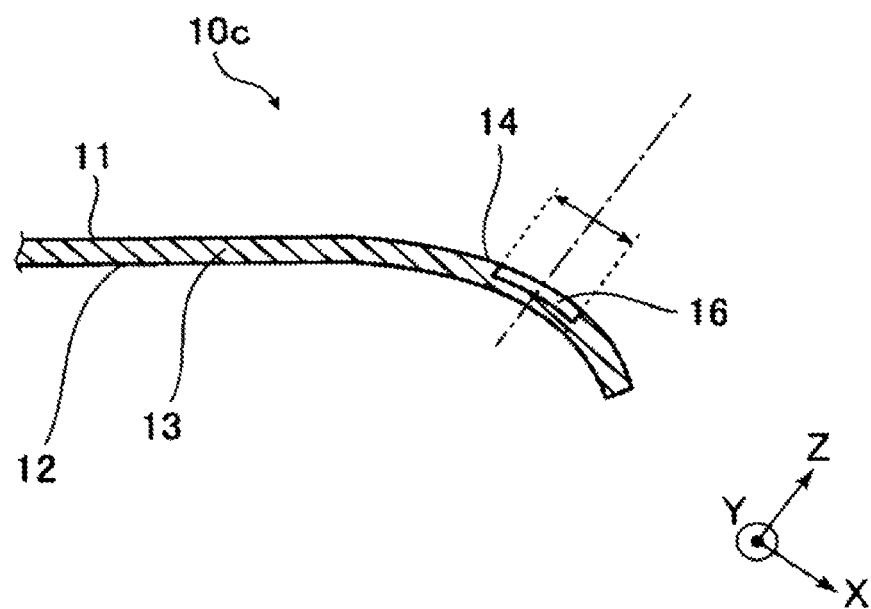

Another configuration example of the curved cover glass of the present embodiment is described below. FIG. 10A and FIG. 10B are a diagram illustrating another configuration example of the curved cover glass of the present embodiment, FIG. 10A is a partial perspective view thereof, and FIG. 10B is a partial side cross-sectional view thereof.

The curved cover glass illustrated in FIG. 10A and FIG. 10B is composed of a plate-like glass body 10c having a first surface 11, a second surface 12 facing the first surface 11, and at least one end face 13 connecting the first surface 11 and the second surface 12. In the plate-like glass body 10c illustrated in FIG. 10A and FIG. 10B, within the first surface 11, only a portion close to the end face on the right side in the figure forms a curvature part 14, similarly to the plate-like glass body 10a illustrated in FIG. 9A and FIG. 9B. In the curvature part 14 of the plate-like glass body 10c illustrated in FIG. 10A and FIG. 10B, at least one concave part 16 is formed (in the curved cover glass illustrated in FIG. 10A and FIG. 10B, three concave parts 16 are formed to align at equal intervals in the Y-axis direction). The concave part 16 is formed in the first surface 11 of the plate-like glass body 10c but, unlike the opening 15 of the plate-like glass body 10a illustrated in FIG. 9A and FIG. 9B, does not extend from the first surface 11 to the second surface 12 of the plate-like glass body 10c. A housing of an automotive interior member or a display unit, etc. can be connected to the plate-like glass body 10c as well by mating a connecting mechanism (not shown) with the concave part 16 provided in the curvature part 14 of the plate-like glass body 10c constituting the curved cover glass.

However, in order to connect a housing of an automotive interior member or a display unit, etc. to the plate-like glass body 10c constituting the curved cover glass by mating a connecting mechanism (not shown) with the concave part 16 provided in the curvature part 14, the concave part 16 provided in the curvature part 14 must have a certain depth. More specifically, the depth of the concave part 16 provided in the curvature part 14 is preferably 0.5 mm or more, more preferably 1 mm or more.

On the other hand, from the viewpoint of preventing breakage of the plate-like glass body 10c constituting the curved cover glass, the depth of the concave part 16 provided in the curvature part 14 is preferably 0.7×t or less, more preferably 0.6×t or less, still more preferably 0.5×t or less, relative to the average thickness t of the plate-like glass body constituting the curved cover glass.

Figure 11A:
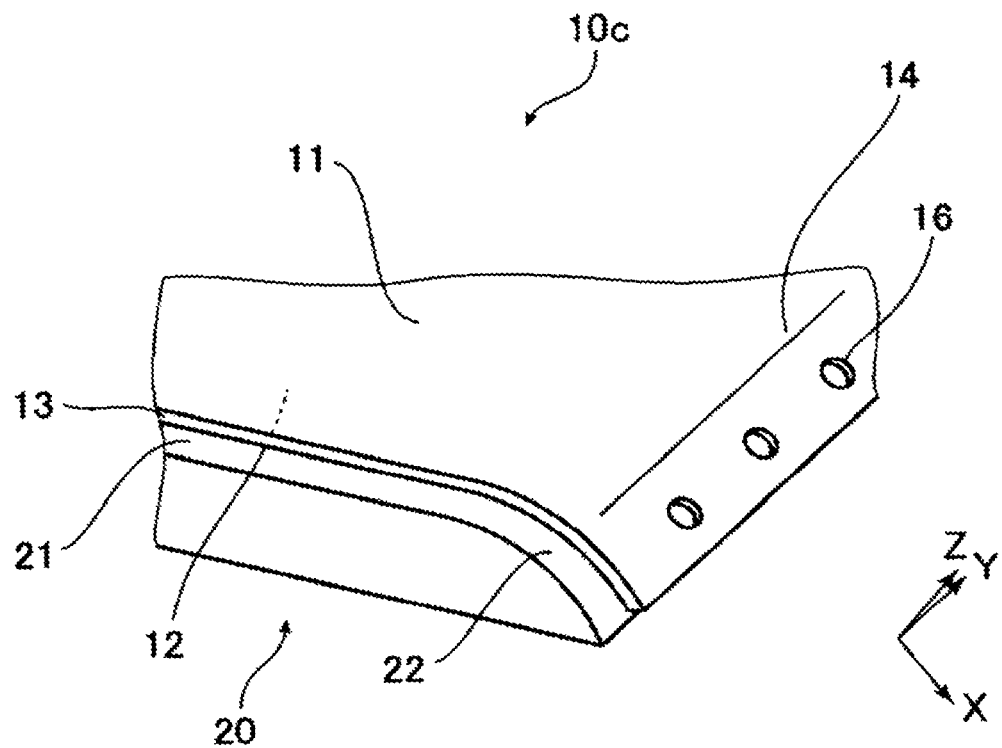
FIG. 11A and FIG. 11B are diagrams illustrating another configuration example of the glass member of the present embodiment.
Figure 11B:
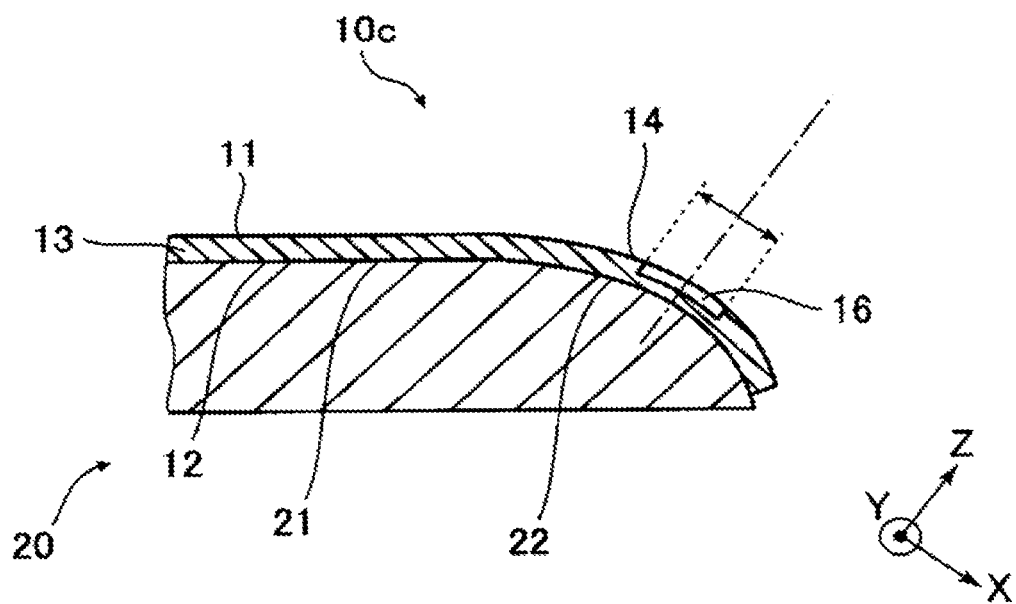

FIG. 11A and FIG. 11B are a diagram illustrating another configuration example of the glass member of the present embodiment, FIG. 11A is a partial perspective view thereof, and FIG. 11B is a partial side cross-sectional view thereof. In the glass member illustrated in FIG. 11A and FIG. 11B, a curved cover glass (a plate-like glass body 10c constituting the curved cover glass) illustrated in FIG. 10A and FIG. 10B and a housing 20 of an automotive interior member or a display unit, etc. are connected. However, in FIG. 11A, the plate-like glass body 10c constituting the curved cover glass and the housing 20 are depicted in the state of being put apart from each other so as to clearly show the positional relationship of both.

In FIG. 11A and FIG. 11B, the second surface 12 of the plate-like glass body 10c constituting the curved cover glass and the screen 21 side of the housing 20 of an automotive interior member or a display unit, etc. are arranged to face each other. Within the screen 21 of the housing 20, the portion facing the curvature part 14 of the plate-like glass body 10c has a curvature part 22.

In FIG. 11A and FIG. 11B, a connecting mechanism (not shown) is mated with the concave part 16 provided in the curvature part 14 of the plate-like glass body 10c constituting the curved cover glass, whereby the housing 20 of an automotive interior member or a display unit, etc. can be connected to the plate-like glass body 10c constituting the curved cover glass.

In FIG. 11A and FIG. 11B, a concave part 16 is formed in the first surface 11, but a concave part 16 may be formed in the second surface 12. The concave part 16 formed in the second surface 12 can be mated with a convex part provided in the housing 20, and as a result, the plate-like glass body is easily fixed.

Figure 12A:
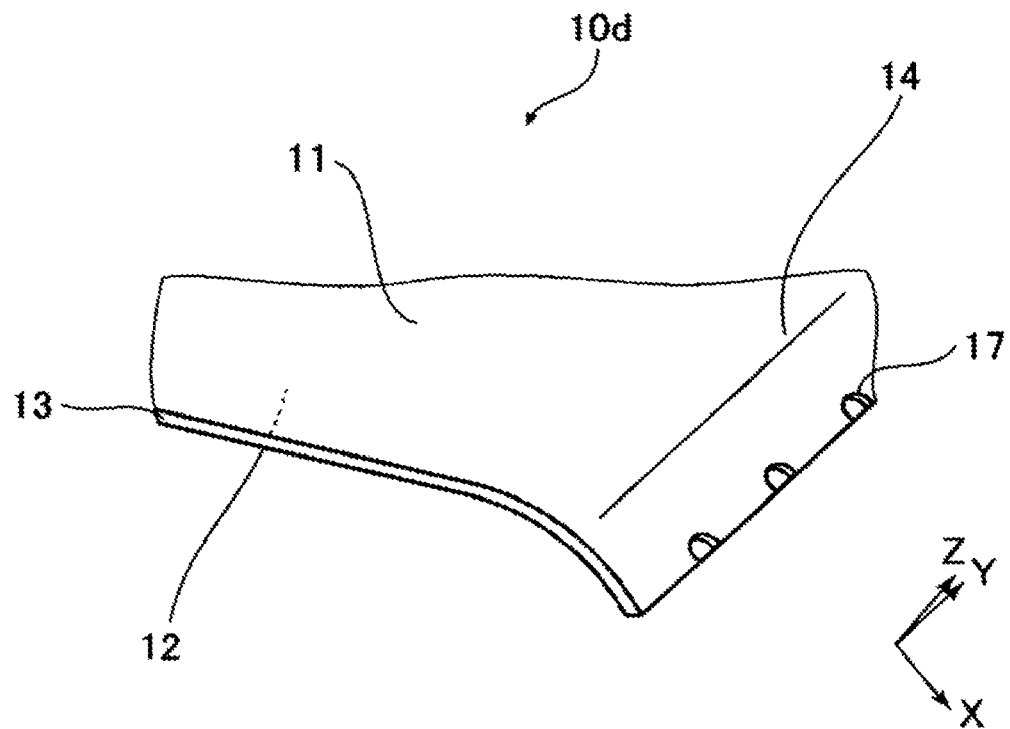
FIG. 12A and FIG. 12B are diagrams illustrating another configuration example of the curved cover glass or curved glass of the present embodiment.
Figure 12B:
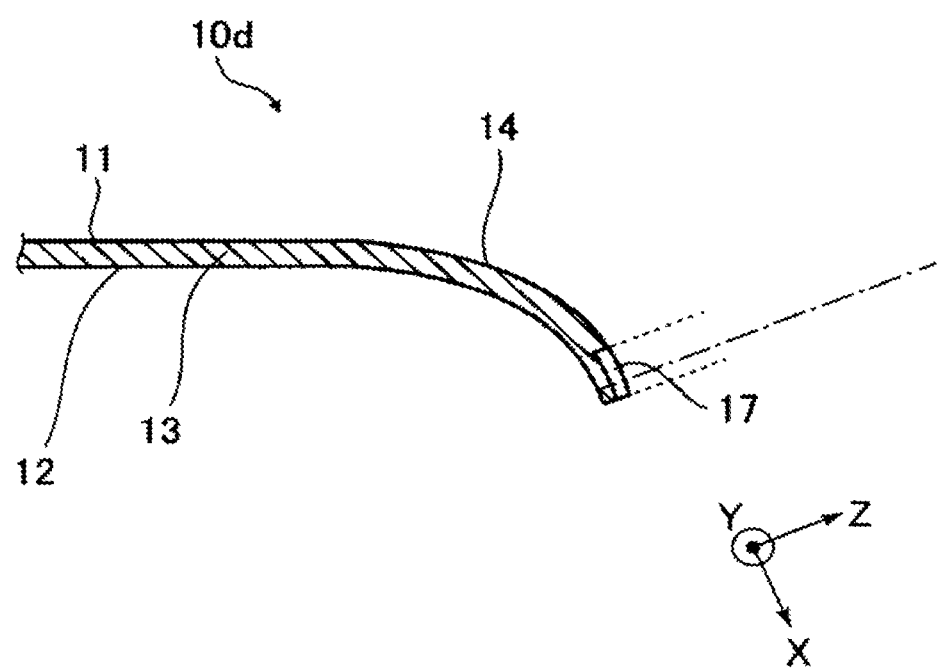

FIG. 12A and FIG. 12B are a diagram illustrating still another configuration example of the curved cover glass of the present embodiment, FIG. 12A is a partial perspective view thereof, and FIG. 12B is a partial side cross-sectional view thereof.

The curved cover glass illustrated in FIG. 12A and FIG. 12B is composed of a plate-like glass body 10d having a first surface 11, a second surface 12 facing the first surface 11, and at least one end face 13 connecting the first surface 11 and the second surface 12. In the plate-like glass body 10d illustrated in FIG. 12A and FIG. 12B, within the first surface 11, only a portion close to the end face on the right side in the figure forms a curvature part 14, similarly to the plate-like glass body 10c illustrated in FIG. 10A and FIG. 10B, and in the curvature part 14, at least one concave part 17 is formed (in the plate-like glass body 10d illustrated in FIG. 12A and FIG. 12B, three concave parts 17 are formed to align at equal intervals in the Y-axis direction). However, while the two-dimensional projected shape of the concave part 16 formed in the curvature part 14 is a substantially circular shape in the plate-like glass body 10c illustrated in FIG. 10A and FIG. 10B, the two-dimensional projected shape of the concave part 17 formed in the curvature part 14 is a substantially semicircular shape in the plate-like glass body 10d illustrated in FIG. 12A and FIG. 12B.

In the case of providing an opening 15 in the curvature part 14 as in the plate-like glass body 10a illustrated in FIG. 4, from the viewpoint of preventing breakage of the plate-like glass body 10a, the opening 15 is preferably provided in a position 5 mm or more away from the end face of the first surface 11. However, in the case of forming a concave part 17 in the curvature part 14 as in the plate-like glass body 10d illustrated in FIG. 12A and FIG. 12B, since the concave part 17 is formed in the first surface 11 of the plate-like glass body 10d but does not extend from the first surface 11 to the second surface 12 of the plate-like glass body 10d, the concave part 17 can be formed in a portion adjacent to the end face of the first surface 11. Accordingly, a concave part 17 of which two-dimensional projected shape is a substantially semicircular shape or a substantially semi-oval shape can be formed by the later-described procedure. On the other hand, in the case of forming a concave part in a position away from the end face of the first surface 11, a concave part of which two-dimensional projected shape is a substantially circular shape or a substantially oval shape can be formed. In this case, the concave part is preferably formed in a position 10 mm or more, more preferably 15 mm or more, still more preferably 20 mm or more, away from the end face of the first surface 11.

Figure 13A:
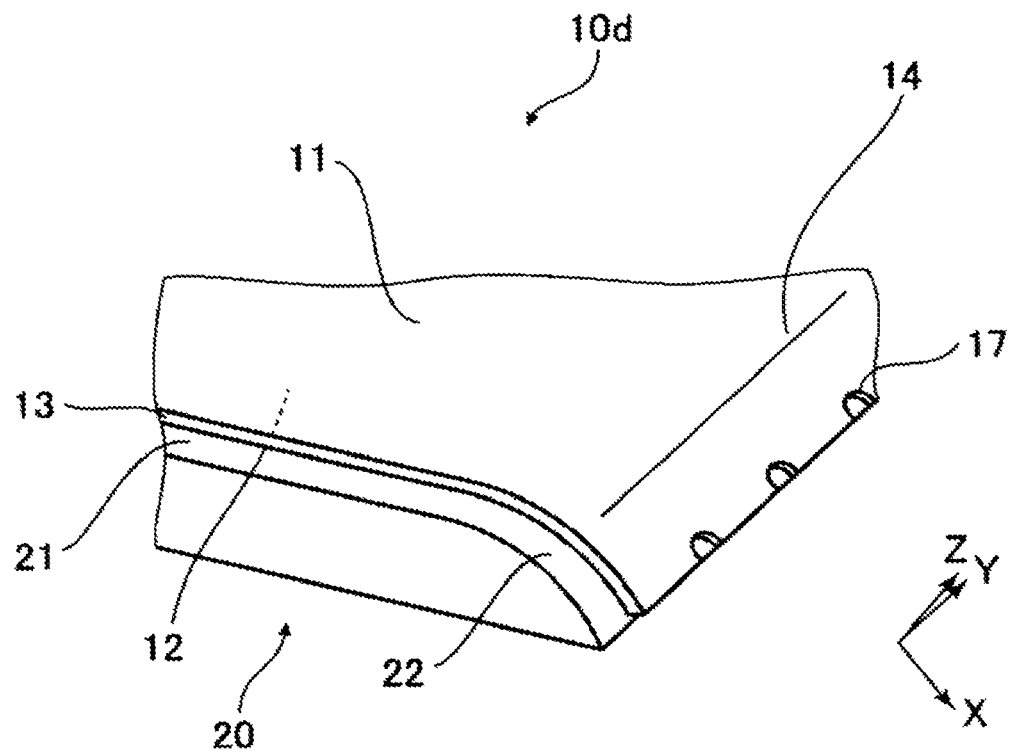
FIG. 13A and FIG. 13B are diagrams illustrating another configuration example of the glass member of the present embodiment.
Figure 13B:
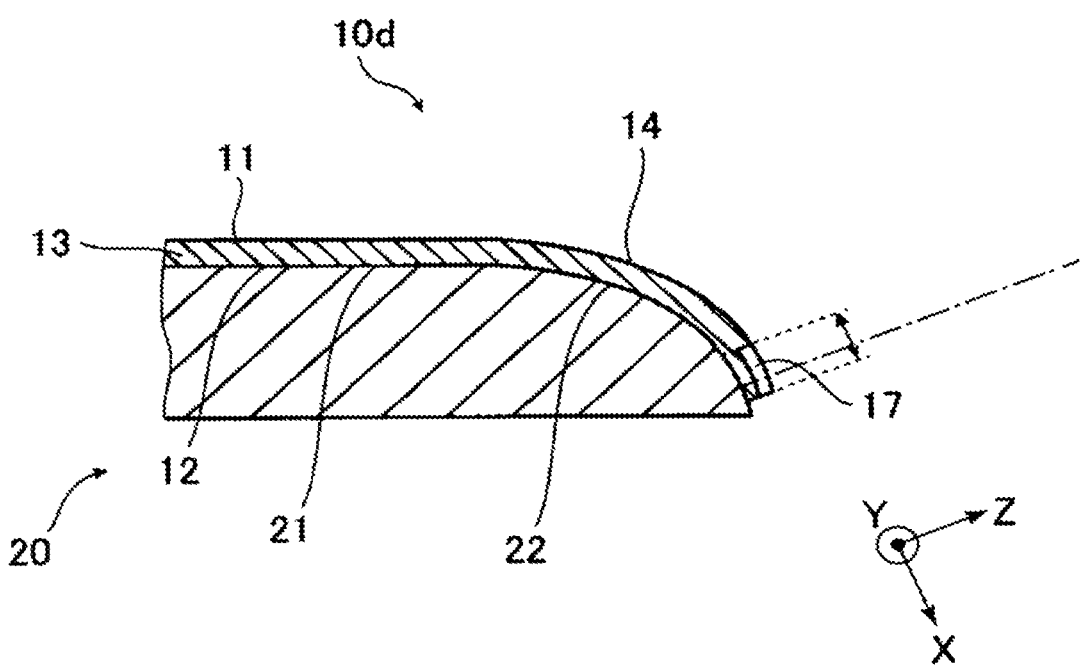

FIG. 13A and FIG. 13B are a diagram illustrating another configuration example of the glass member of the present embodiment, FIG. 13A is a partial perspective view thereof, and FIG. 13B is a partial side cross-sectional view thereof. In the glass member illustrated in FIG. 13A and FIG. 13B, a curved cover glass (a plate-like glass body 10d constituting the curved cover glass) illustrated in FIG. 12A and FIG. 12B and a housing 20 of an automotive interior member or a display unit, etc. are connected. However, in FIG. 13A, the plate-like glass body 10d constituting the curved cover glass and the housing 20 are depicted in the state of being put apart from each other so as to clearly show the positional relationship of both.

In FIG. 13A and FIG. 13B, the second surface 12 of the plate-like glass body 10d constituting the curved cover glass and the screen 21 side of the housing 20 of an automotive interior member or a display unit, etc. are arranged to face each other. Within the screen 21 of the housing 20, the portion facing the curvature part 14 of the plate-like glass body 10d has a curvature part 22.

In FIG. 13A and FIG. 13B, a connecting mechanism (not shown) is mated with the concave part 17 provided in the curvature part 14 of the plate-like glass body 10d constituting the curved cover glass, whereby the housing 20 of an automotive interior member or a display unit, etc. can be connected to the plate-like glass body 10d constituting the curved cover glass.

In the curved cover glass where a concave part is formed in the curvature part, from the viewpoint of preventing breakage of the plate-like glass body 10c or 10d constituting the curved cover glass, the maximum length in the two-dimensional projected shape of the concave part 16 or 17 is preferably 1.5 mm or more and 200 mm or less.

The maximum length in the two-dimensional projected shape of the concave part 16 or 17 is more preferably 30 mm or less, still more preferably 10 mm or less.

In both cases of a curved cover glass having formed in the curvature part thereof an opening and a curved cover glass having formed in the curvature part thereof a concave part, the first surface of the plate-like glass body constituting the curved cover glass may be a convex surface as in the embodiment illustrated or may be a concave surface. In the case of using the curved cover glass of the present embodiment as a cover glass of an automotive interior member or a display unit, etc., from the viewpoint of enhancing the visibility, the first surface working out to a screen during the use as a cover glass of an automotive interior member or a display unit, etc. is preferably a concave surface.

In both cases of a curved cover glass having formed therein an opening and a curved cover glass having formed therein a concave part, as long as at least one opening or at least one concave part is formed in the curvature part, the number of openings or curvature parts is not particularly limited and may be only one or may be plural. In the case of passing/fitting or mating a connecting mechanism through/into or with an opening or curvature part, thereby connecting a housing of an automotive interior member or a display unit, etc. to the plate-like glass body constituting the curved cover glass, the number of openings or concave parts is preferably plural. In the case of forming a plurality of openings or a plurality of concave parts in a curvature part, a substantially flat part or a flat part, the plurality of openings or concave parts may have different roles. For example, while a part of openings or a part of concave parts plays a role in connecting a housing of an automotive interior member or a display unit, etc. to the plate-like glass body constituting the curve cover glass by passing/fitting or mating a connecting mechanism through/into or with the opening or concave part, the remaining openings or remaining concave parts may play a role as a speaker, etc. In this case, the openings or concave parts playing respective functions may be different from each other in the shape or dimension. In addition, a louver used for air conditioning equipment, a metal member or resin member used for design or fixation, a decorative glass, etc. may be put in the opening or concave part, or a start button may be exposed through the opening.

From the viewpoint of enhancing the visibility, the plate-like glass body constituting the curved cover glass preferably has a curvature part at least at one arbitrary point in the first surface in a portion adjacent to the end face or at one arbitrary point within 100 mm from the end face. Here, the former is a case where the curvature part on the first surface is connected to the end face, and the latter is a case where the curvature part on the first surface is not connected to the end face. In the latter, a substantially flat part or a specific curvature part is present between the curvature part on the first surface and the end face. In the latter case, it is more preferable to have a curvature part at one arbitrary point within 50 mm from the end face, and it is still more preferable to have a curvature part at one arbitrary point within 30 mm from the end face.

In the case where the surface in the curvature part of the plate-like glass body constituting the curved cover glass is bent also in the Y-axis direction, from the viewpoint of enhancing the visibility, the plate-like glass body constituting the curved cover glass preferably has a second curvature radius $R_2$ of 300 to 10,000 mm at least at one or more points in the first surface in a portion adjacent to the end face or at one or more points within 100 mm from the end face. Here, the former is a case where the curvature part on the first surface is connected to the end face, and the latter is a case where the curvature part on the first surface is not connected to the end face. In the latter, a substantially flat part or a specific curvature part is present between the curvature part on the first surface and the end face. In the latter case, it is more preferred that the second curvature radius $R_2$ is from 300 to 10,000 mm at one arbitrary point within 50 mm from the end face, and it is still more preferred that the second curvature radius $R_2$ is from 300 to 10,000 mm at one arbitrary point within 30 mm from the end face.

In the curved cover glass of the present embodiment, the maximum length in a two-dimensional projected shape of the first surface of a plate-like glass body constituting the curved cover glass is preferably 50 mm or more and 1,000 mm or less, because the effect of enhancing the visibility due to providing a curvature part becomes prominent, and the maximum length is more preferably 200 mm or more and 700 mm or less, still more preferably 300 mm or more and 600 mm or less. Here, the maximum length in a two-dimensional projected shape of the plate-like glass body indicates a maximum straight line length out of straight lines connecting arbitrary two points on the contour of a plan view having a largest area among plan views obtained by projecting the first surface of a plate-like glass body constituting the curved cover glass onto a two-dimensional plane from an arbitrary direction. When the maximum length in a two-dimensional projected shape is 50 mm or more and 1,000 mm or less, the two-dimensional projected shape is not too small for use as a cover glass of an automotive interior member or a display unit, etc., and the viewing angle for the user does not excessively extend in the transverse direction and/or the longitudinal direction.

In the curved cover glass of the present embodiment, in order to ensure mechanical strength and scratch resistance required as a cover glass of an automotive interior member or a display unit, etc., the plate-like glass body constituting the curved cover glass is chemically strengthened. In the plate-like glass body that is a chemically strengthened glass, due to chemical strengthening, a compressive stress layer is formed in the surface, and the strength and scratch resistance are thereby increased. Chemical strengthening is a treatment conducted at a temperature equal to or less than a glass transition point for forming a compressive stress layer in a glass surface by replacing an alkali metal ion (typically, Li ion or Na ion) having a smaller ionic radius in the glass surface with an alkali metal ion (typically, K ion) having a larger ionic radius by way of ion exchange. The chemical strengthening treatment can be conducted by a conventionally known method.

The glass composition of the plate-like glass body constituting the curved cover glass is not particularly limited as long as a chemical strengthening treatment is possible, and examples thereof include, for example, soda lime silicate glass, aluminosilicate glass, borate glass, lithium aluminosilicate glass, and borosilicate glass.

In the plate-like glass body constituting the curved cover glass, the total of the contents of $Li_2O$ and $Na_2O$ in the glass composition is preferably 12 mol % or more so as to appropriately perform the chemical strengthening treatment. In addition, for the reason that as the content of $Li_2O$ in the glass composition increases, the glass transition point lowers and forming is facilitated, the content of $Li_2O$ is preferably 0.5 mol % or more, more preferably 1.0 mol % or more, still more preferably 2.0 mol % or more. Furthermore, in order to increase the surface compressive stress (Compressive Stress: CS) and the depth of compressive stress layer (Depth of Layer: DOL), the glass composition of the plate-like glass body preferably contains 60 mol % or more of $SiO_2$ and 8 mol % or more of $Al_2O_3$. Here, in the plate-like glass body constituting the curved cover glass, the maximum value of the surface compressive stress in the first surface is preferably 600 MPa or more, and the depth of the compressive stress layer is preferably 10 μm or more. When the surface compressive stress and depth of compressive stress layer fall within the ranges above, excellent strength and scratch resistance are obtained.

Specific examples of the glass composition of the plate-like glass body constituting the curved cover glass include a glass containing, as a composition represented by mol %, from 50 to 80% of $SiO_2$, from 0.1 to 25% of $Al_2O_3$, from 3 to 30% of $Li_2O+Na_2O+K_2O$, from 0 to 25% of MgO, from 0 to 25% of CaO, and from 0 to 5% of $ZrO_2$, but the glass composition is not particularly limited thereto. More specifically, examples of the glass composition include the following glass compositions. Here, for example, the phrase "containing from 0 to 25% of MgO" means that MgO is not essential but may be contained up to 25%. The glass of (i) is encompassed by soda lime silicate glass, and the glasses of (ii) and (iii) are encompassed by aluminosilicate glass.

(i) A glass containing, as a composition represented by mol %, from 63 to 73% of $SiO_2$, from 0.1 to 5.2% of $Al_2O_3$, from 10 to 16% of $Na_2O$, from 0 to 1.5% of $K_2O$, from 0 to 5.0% of $Li_2O$, from 5 to 13% of MgO, and from 4 to 10% of CaO.

(ii) A glass containing, as a composition represented by mol %, from 50 to 74% of $SiO_2$, from 1 to 10% of $Al_2O_3$, from 6 to 14% of $Na_2O$, from 3 to 11% of $K_2O$, from 0 to 5.0% of $Li_2O$, from 2 to 15% of MgO, from 0 to 6% of CaO, and from 0 to 5% of $ZrO_2$, wherein the total of the contents of $SiO_2$ and $Al_2O_3$ is 75% or less, the total of the contents of $Na_2O$ and $K_2O$ is from 12 to 25%, and the total of the contents of MgO and CaO is from 7 to 15%.

(iii) A glass containing, as a composition represented by mol %, from 68 to 80% of $SiO_2$, from 4 to 10% of $Al_2O_3$, from 5 to 15% of $Na_2O$, from 0 to 1% of $K_2O$, from 0 to 5.0% of $Li_2O$, from 4 to 15% of MgO, and from 0 to 1% of $ZrO_2$.

(iv) A glass containing, as a composition represented by mol %, from 67 to 75% of $SiO_2$, from 0 to 4% of $Al_2O_3$, from 7 to 15% of $Na_2O$, from 1 to 9% of $K_2O$, from 0 to 5.0% of $Li_2O$, from 6 to 14% of MgO, and from 0 to 1.5% of $ZrO_2$, wherein the total of the contents of $SiO_2$ and $Al_2O_3$ is from 71 to 75%, the total of the contents of $Na_2O$ and $K_2O$ is from 12 to 20%, and in the case of containing CaO, the content thereof is less than 1%.

In the present embodiment, the plate-like glass body constituting the curved cover glass is preferably formed into a predetermined shape from planar sheet glass. As to the forming method used, a desired forming method may be selected from a gravity forming method, a vacuum forming method, and a press forming method, depending on the shape of the plate-like glass body after forming.

The gravity forming method is a method of placing sheet glass on a predetermined mold appropriate to the shape of the plate-like glass body after forming, softening the sheet glass, and bending the sheet glass by gravity to fit in with the mold, thereby forming into a predetermined shape.

The vacuum forming method is a method of applying a differential pressure to front and back surfaces of sheet glass in the state of the sheet glass being softened, and bending the sheet glass to fit in with the mold, thereby forming into a predetermined shape. In the vacuum forming method, sheet glass is placed on a predetermined mold appropriate to the shape of the plate-like glass body after forming, a clamping mold is placed on the sheet glass, the periphery of the sheet glass is sealed, and the space between the mold and the sheet glass is then depressurized by a pump to apply a differential pressure to front and back surfaces of the sheet glass. At this time, the top surface side of the sheet glass may be pressurized supplementarily.

The press forming is a method of placing sheet glass between predetermined molds (upper mold and lower mold) appropriate to the shape of the plate-like glass body after forming, applying a pressing load between upper and lower molds in the state of the sheet glass being softened, and bending the sheet glass to fit in with the mold, thereby forming into a predetermined shape.

Among them, a vacuum forming method is particularly preferred as the method for forming a plate-like glass body constituting the curved cover glass into a predetermined shape. In the vacuum forming method, forming can be performed while keeping one main surface out of two facing main surfaces of the plate-like glass body from contacting with the forming mold, and a concave-convex defect such as scratch and dent can thereby be reduced. The main surface on the side not coming into contact with the forming mold is used as the first surface, and the number of specific curvature parts on the first surface can thereby be reduced to 10 or less per unit area of 1 mm$^2$, which is preferred from the viewpoint of enhancing the visibility.

Two or more kinds of forming methods may be used in combination depending on the shape of the plate-like glass body after forming.

The plate-like glass body after forming may be reheated (annealed) to remove residual strain remaining in the plate-like glass body. This makes it possible not only to obtain a glass with reduced residual strain but also to achieve uniform chemical strengthening in a chemical strengthening step conducted thereafter.

The opening or concave part formed in the curvature part of a plate-like glass body formed into a predetermined shape by the above-described procedure can be formed by causing a drill including a grindstone in a cutting part to rotate around the axis of rotation and move orbitally around an axis extending from the first surface to the second surface of the plate-like glass body in a spiral manner. Here, the pitch for spiraling of the drill (the distance the drill travels per revolution) is preferably from 0.1 to 5 mm, more preferably 0.2 to 4 mm, still more preferably from 0.3 to 3 mm. The radius of the orbital motion is preferably equal to or more than (maximum diameter in two-dimensional projected shape of opening 15 or concave part 16 or 17)×0.1.

Since the opening or concave part formed by means of a drill is in the state of its end face having a sharp edge, the end face thereof, i.e., the end faces on the first and second sides of the opening or the end face on the first surface side of the concave part, is preferably subjected to chamfering or etching.

As other steps, a chemical strengthening step may be conducted after forming the opening or concave part (drilling step). By this step, chemical strengthening is conducted after forming the opening or concave part and therefore, the end face of the hole is also chemically strengthened, and as a result, a high-strength curved cover glass is obtained. Furthermore, chamfering or polishing of the end face of the hole may also be conducted after the drilling step. By this working, cracks related to the strength can be removed, and a curved cover glass with higher strength is obtained. However, in the case of a curved cover glass not requiring strength, the drilling work may be performed after a chemical strengthening step. Furthermore, printing may be conducted, and the printing step may be conducted before and after any of the above-described steps.

In the plate-like glass body constituting the curved cover glass, various functional films may be formed, if desired, on the first surface of the plate-like glass body, which works out to a screen when used as a cover glass of an automotive interior component or a display unit, etc. Specific examples of the functional film include an antiglare film, an antireflection film, and an antifouling film. The functional layer is provided at least in a curvature part within the first surface of the plate-like glass body.

In the case where an antiglare film is formed on the first surface of the plate-like glass body, the haze in the curvature part on the first surface is preferably 40% or less, more preferably 30% or less, still more preferably 20% or less. When the haze is 40% or less, reduction in the contrast can be sufficiently suppressed.

In the case where an antifouling film is formed on the first surface of the plate-like glass body, the static friction coefficient in the curvature part on the first surface is preferably 1.0 or less, more preferably 0.9 or less, still more preferably 0.8 or less. When the static friction coefficient is 1.0 or less, good finger slipperiness is exhibited at the time of touching the curvature part on the first surface with a human finger. The dynamic friction coefficient in the curvature part on the first surface is preferably 0.02 or less, more preferably 0.015 or less, still preferably 0.01 or less. When the dynamic friction coefficient is 0.02 or less, good finger slipperiness is exhibited at the time of touching the curvature part on the first surface with a human finger.

The glass of the present invention can be used for both an exterior member and an interior member, may be used as a cover glass provided on the outer surface of an electronic device such as display unit, touch panel and sensor, and may be provided on the outer surface of not only an electronic device but also an ornament, a building material, furniture, and an operation panel, an emblem or an interior trim of automobiles.

This application is based on Japanese Patent Application No. 2015-35183 filed on Feb. 25, 2015, the contents of which are incorporated herein by way of reference.

DESCRIPTION OF REFERENCE NUMERALS AND SIGNS 10a, 10b, 10c, 10d: Plate-like glass body
11: First surface
12: Second surface
13: End face
14: Curvature part
15: Opening 16, 17: Concave part
20: Housing
21: Screen
22: Curvature part
100: Plate-like glass body
110: First surface
120: Second surface
130: End face

The invention claimed is:

1. A curved cover glass, comprising:
a plate-like glass body configured to cover a surface of a display unit in a display device and having a first surface, a second surface facing the first surface, and at least one end face connecting the first surface and the second surface such that the plate-like glass body has an average thickness $t_{ave}$ of 5 mm or less and that the first surface has a flat part and a curvature part in which a surface is bent only in a direction of an X-axis at least at one point on the first surface and at least one opening is formed to extend from the first surface to the second surface and positioned to mount the plate-like glass body on the surface of the display unit in the display device; and
an antifouling film formed on the first surface of the plate-like glass body such that the antifouling film is covering at least the curvature part of the first surface of the plate-like glass body,
wherein the X-axis is a tangential direction from an arbitrary point on the first surface such that a first curvature radius $R_1$ in cross-section of the first surface in an XZ plane passing the X-axis and a Z-axis is minimum and 10,000 mm or less, a Y-axis is orthogonal to the X-axis, and the Z-axis is orthogonal to the X-axis and the Y-axis.

2. A curved cover glass, comprising:
a plate-like glass body configured to cover a surface of a display unit in a display device and having a first surface, a second surface facing the first surface, and at least one end face connecting the first surface and the second surface such that the plate-like glass body having an average thickness $t_{ave}$ of 5 mm or less and that the first surface has a flat part and a curvature part in which a surface is bent in a direction of an X-axis at least at one point on the first surface and at least one opening is formed to extend from the first surface to the second surface and positioned to mount the plate-like glass body on the surface of the display unit in the display device; and
an antifouling film formed on the first surface of the plate-like glass body such that the antifouling film is covering at least the curvature part of the first surface of the plate-like glass body,
wherein the X-axis is a tangential direction from an arbitrary point on the first surface such that a first curvature radius $R_1$ in cross-section of the first surface in an XZ plane passing the X-axis and a Z-axis is minimum and 10,000 mm or less, a Y-axis is orthogonal to the X-axis, and the Z-axis is orthogonal to the X-axis and the Y-axis.

3. The curved cover glass according to claim 1, wherein a maximum diameter d in a two-dimensional projected shape of the opening is 50 mm or less.

4. The curved cover glass according to claim 2, wherein a maximum diameter d in a two-dimensional projected shape of the opening is 50 mm or less.

5. The curved cover glass according to claim 1, wherein a ratio d/L of a maximum diameter d (mm) in a two-dimensional projected shape of the opening to a maximum length L (mm) of the curvature part in a two-dimensional projected shape of the first surface is 0.6 or less.

6. The curved cover glass according to claim 2, wherein a ratio d/L of a maximum diameter d (mm) in a two-dimensional projected shape of the opening to a maximum length L (mm) of the curvature part in a two-dimensional projected shape of the first surface is 0.6 or less.

7. The curved cover glass according to claim 1, wherein an angle θ formed by an axis of the opening extending from the first surface to the second surface and a normal line of the first surface in a portion in which the opening is provided is 0°≤θ≤60°.

8. The curved cover glass according to claim 2, wherein an angle θ formed by an axis of the opening extending from the first surface to the second surface and a normal line of the first surface in a portion in which the opening is provided is 0°≤θ≤60°.

9. The curved cover glass according to claim 1, wherein an angle formed by an axis of the opening extending from the first surface to the second surface and a normal line of the first surface in a portion in which the opening is provided is 5°≤θ≤60°.

10. The curved cover glass according to claim 2, wherein an angle θ formed by an axis of the opening extending from the first surface to the second surface and a normal line of the first surface in a portion in which the opening is provided is 5°≤θ≤60°.

11. A curved cover glass, comprising:
a plate-like glass body configured to cover a surface of a display unit in a display device and having a first surface, a second surface facing the first surface, and at least one end face connecting the first surface and the second surface such that the plate-like glass body has an average thickness $t_{ave}$ of 5 mm or less and that the first surface has a flat part and a curvature part in which a surface is bent only in a direction of an X-axis at least at one point on the first surface and at least one concave part is formed to have, as a two-dimensional projected shape, a substantially circular shape, a substantially oval shape, a substantially semicircular shape or a substantially semi-oval shape, with a maximum length in the two-dimensional projected shape being from 1.5 to 200 mm and positioned to mount the plate-like glass body on the surface of the display unit in the display device; and
an antifouling film formed on the first surface of the plate-like glass body such that the antifouling film is covering at least the curvature part of the first surface of the plate-like glass body,
wherein the X-axis is a tangential direction from an arbitrary point on the first surface such that a first curvature radius $R_1$ in cross-section of the first surface in an XZ plane passing the X-axis and a Z-axis is minimum and 10,000 mm or less, a Y-axis is orthogonal to the X-axis, and the Z-axis is orthogonal to the X-axis and the Y-axis.

12. A curved cover glass, comprising:
a plate-like glass body configured to cover a surface of a display unit in a display device and having a first surface, a second surface facing the first surface, and at least one end face connecting the first surface and the second surface such that the plate-like glass body has an average thickness $t_{ave}$ of 5 mm or less and that the first surface has a flat part and a curvature part in which a surface is bent in a direction of an X-axis at least at one point on the first surface and at least one concave part is formed to have, as a two-dimensional projected shape, a substantially circular shape, a substantially oval shape, a substantially semicircular shape or a substantially semi-oval shape, with a maximum length in the two-dimensional projected shape being from 1.5 to 200 mm and positioned to mount the plate-like glass body on the surface of the display unit in the display device; and an antifouling film formed on the first surface of the plate-like glass body such that the antifouling film is covering at least the curvature part of the first surface of the plate-like glass body, wherein the X-axis is a tangential direction from an arbitrary point on the first surface such that a first curvature radius $R_1$ in cross-section of the first surface in an XZ plane passing the X-axis and a Z-axis is minimum and 10,000 mm or less, a Y-axis is orthogonal to the X-axis, and the Z-axis is orthogonal to the X-axis and the Y-axis.

13. The curved cover glass according to claim 11, wherein the concave part is provided in a portion adjacent to the end face of the first surface or in a portion 5 mm or more away from the end face of the first surface.

14. The curved cover glass according to claim 12, wherein the concave part is provided in a portion adjacent to the end face of the first surface or in a portion 5 mm or more away from the end face of the first surface.

15. The curved cover glass according to claim 1, wherein the first surface has the curvature part at least at one arbitrary point in a portion adjacent to the end face or at one arbitrary point within 100 mm from the end face, and the curvature part comprises the at least one opening.

16. The curved cover glass according to claim 2, wherein the first surface has the curvature part at least at one arbitrary point in a portion adjacent to the end face or at one arbitrary point within 100 mm from the end face, and the curvature part comprises the at least one opening.

17. The curved cover glass according to claim 11, wherein the first surface has the curvature part at least at one arbitrary point in a portion adjacent to the end face or at one arbitrary point within 100 mm from the end face, and the curvature part comprises the at least one concave part.

18. The curved cover glass according to claim 12, wherein the first surface has the curvature part at least at one arbitrary point in a portion adjacent to the end face or at one arbitrary point within 100 mm from the end face, and the curvature part comprises the at least one concave part.

19. The curved cover glass according to claim 1, wherein the surface is bent in the Y-axis direction at least at one point in the curvature part and a second curvature radius $R_2$, in cross-section of the first surface of the plate-like glass body in an YZ plane passing the Y-axis and the Z-axis is in a range of from 300 to 10,000 mm.

20. The curved cover glass according to claim 2, wherein the surface is bent in the Y-axis direction at least at one point in the curvature part and a second curvature radius $R_2$ in cross-section of the first surface of the plate-like glass body in an YZ plane passing the Y-axis and the Z-axis is in a range of from 300 to 10,000 mm.

21. The curved cover glass according to claim 11, wherein the surface is bent in the Y-axis direction at least at one point in the curvature part and a second curvature radius $R_2$ in cross-section of the first surface of the plate-like glass body in an YZ plane passing the Y-axis and the Z-axis is in a range of from 300 to 10,000 mm.

22. The curved cover glass according to claim 12, wherein the surface is bent in the Y-axis direction at least at one point in the curvature part and a second curvature radius $R_2$ in cross-section of the first surface of the plate-like glass body in an YZ plane passing the Y-axis and the Z-axis is in a range of from 300 to 10,000 mm.

23. The curved cover glass according to claim 1, wherein on the first surface, the number of a specific curvature part having the first curvature radius $R_1$ of less than 300 mm is 10 or less per unit area of 1 $mm^2$.

24. The curved cover Mass according to claim 2, wherein on the first surface, the number of a specific curvature part having the first curvature radius $R_1$ of less than 300 mm is 10 or less per unit area of 1 $mm^2$.

25. The curved cover glass according to claim 11, wherein on the first surface, the number of a specific curvature part having the first curvature radius $R_1$ of less than 300 mm is 10 or less per unit area of 1 $mm^2$.

26. The curved cover glass according to claim 12, wherein on the first surface, the number of a specific curvature part having the first curvature radius $R_1$ of less than 300 mm is 10 or less per unit area of 1 $mm^2$.

27. The curved cover glass according to claim 1, wherein the plate-like glass body has been chemically strengthened.

28. The curved cover glass according to claim 2, wherein the plate-like glass body has been chemically strengthened.

29. The curved cover glass according to claim 11, wherein the plate-like glass body has been chemically strengthened.

30. The curved cover glass according to claim 12, wherein the plate-like glass body has been chemically strengthened.

31. The curved cover glass according to claim 27, wherein a maximum value of a surface compressive stress in the first surface is 600 MPa or more.

32. The curved cover glass according to claim 28, wherein a maximum value of a surface compressive stress in the first surface is 600 MPa or more.

33. The curved cover glass according to claim 29, wherein a maximum value of a surface compressive stress in the first surface is 600 MPa or more.

34. The curved cover glass according to claim 30, wherein a maximum value of a surface compressive stress in the first surface is 600 MPa or more.

35. A glass member, comprising:
the curved cover glass of claim 1; and
a housing having at least one connecting mechanism passing through and fitting into the opening of the curved cover glass to connect the curved cover glass and the housing.

36. A glass member, comprising:
the curved cover glass of claim 2; and
a housing having at least one connecting mechanism passing through and fitting into the opening of the curved cover glass to connect the curved cover glass and the housing.

37. A glass member, comprising:
the curved cover glass of claim 11; and
a housing having at least one connecting mechanism mating with the concave part of the curved cover glass to connect the curved cover glass and the housing.

38. A glass member, comprising:
the curved cover glass of claim 12; and
a housing having at least one connecting mechanism mating with the concave part of the curved cover glass to connect the curved cover glass and the housing.

39. A display device, comprising:
the curved cover glass of claim 1; and
a display unit having a surface covered with the curved cover glass.

40. A display device, comprising:
the curved cover glass of claim 2; and
a display unit having a surface covered with the curved cover glass.

41. A display device, comprising:
the curved cover glass of claim 11; and
a display unit having a surface covered with the curved cover glass.

42. A display device, comprising:
the curved cover glass of claim 12; and
a display unit having a surface covered with the curved cover glass.

43. A method for manufacturing the curved cover glass as described in claim 1, the method comprising:
forming the opening by causing a drill comprising a grindstone in a cutting part to rotate around an axis of rotation and move orbitally around an axis extending from the first surface to the second surface in a spiral manner.

44. A method for manufacturing the curved cover glass as described in claim 11, the method comprising:
forming the concave part by causing a drill comprising a grindstone in a cutting part to rotate around an axis of rotation and move orbitally around an axis extending from the first surface to the second surface in a spiral manner.

45. The method for manufacturing the curved cover glass according to claim 43, wherein an end face of the opening is chamfered.

46. The method for manufacturing the curved cover glass according to claim 44, wherein an end face of the concave part is chamfered.

47. The method for manufacturing the curved cover glass according to claim 43, wherein the plate-like glass body is formed by a vacuum forming method.

48. The method for manufacturing the curved cover glass according to claim 44, wherein the plate-like glass body is formed by a vacuum forming method.

49. A curved cover glass, comprising:
a plate-like glass body configured to cover a surface of a display unit in a display device and having a first surface, a second surface facing the first surface, and at least one end face connecting the first surface and the second surface such that the plate-like glass body has an average thickness $t_{ave}$ of 5 mm or less and that the first surface has a flat part and a curvature part in which a surface is bent only in a direction of an X-axis at least at one point on the first surface and at least one opening is formed to extend from the first surface to the second surface and positioned to mount the plate-like glass body on the surface of the display unit in the display device; and
an antifouling film formed on the first surface of the plate-like glass body such that the antifouling film is covering at least the curvature part of the first surface of the plate-like glass body,
wherein the X-axis is a tangential direction from an arbitrary point on the first surface such that a first curvature radius $R_1$ in cross-section of the first surface in an XZ plane passing the X-axis and a Z-axis is minimum and 3,000 mm or less, a Y-axis is orthogonal to the X-axis, and the Z-axis is orthogonal to the X-axis and the Y-axis.

50. A curved cover glass, comprising:
a plate-like glass body configured to cover a surface of a display unit in a display device and having a first surface, a second surface facing the first surface, and at least one end face connecting the first surface and the second surface such that the plate-like glass body having an average thickness $t_{ave}$ of 5 mm or less and that the first surface has a flat part and a curvature part in which a surface is bent in a direction of an X-axis at least at one point on the first surface and at least one opening is formed to extend from the first surface to the second surface and positioned to mount the plate-like glass body on the surface of the display unit in the display device; and
an antifouling film formed on the first surface of the plate-like glass body such that the antifouling film is covering at least the curvature part of the first surface of the plate-like Mass body,
wherein the X-axis is a tangential direction from an arbitrary point on the first surface such that a first curvature radius $R_1$ in cross-section of the first surface in an XZ plane passing the X-axis and a Z-axis is minimum and 3.000 mm or less, a Y-axis is orthogonal to the X-axis, and the Z-axis is orthogonal to the X-axis and the Y-axis.

51. The curved glass according to claim 49, wherein the plate-like glass body is a chemically strengthened glass.

52. The curved glass according to claim 50, wherein the plate-like Mass body is a chemically strengthened glass.

53. The curved glass according to claim 51, wherein a maximum value of a surface compressive stress in the first surface is 600 MPa or more.

54. The curved glass according to claim 52, wherein a maximum value of a surface compressive stress in the first surface is 600 MPa or more.

55. An automotive interior component, comprising:
a display device comprising the curved cover glass of claim 12 and a display unit having a surface covered with the curved cover glass.

56. A mobile device, comprising:
a display device comprising the curved cover glass of claim 2 and a display unit having a surface covered with the curved cover glass.

* * * * *